United States Patent
Babinec et al.

(10) Patent No.: US 6,380,294 B1
(45) Date of Patent: *Apr. 30, 2002

(54) COMPOSITIONS OF INTERPOLYMERS OF α-OLEFIN MONOMERS WITH ONE OR MORE VINYL OR VINYLIDENE AROMATIC MONOMERS AND/OR ONE OR MORE HINDERED ALIPHATIC OR CYCLOALIPHATIC VINYL OR VINYLIDENE MONOMERS BLENDED WITH A CONDUCTIVE ADDITIVE

(75) Inventors: Susan J. Babinec; Mechelle A. Blanchard, both of Midland, MI (US); Martin J. Guest; Brian W. Walther, both of Lake Jackson, TX (US); Bharat I. Chaudhary, Pearland, TX (US); Russell P. Barry, Baden Wuertenburg (DE)

(73) Assignee: The Dow Chemical Company, Midland, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,381

(22) Filed: Oct. 15, 1998

Related U.S. Application Data

(60) Provisional application No. 60/062,305, filed on Oct. 17, 1997.

(51) Int. Cl.$^7$ .................................................. C08K 3/08
(52) U.S. Cl. ...................................... 524/440; 252/512
(58) Field of Search ......................................... 524/440

(56) References Cited

U.S. PATENT DOCUMENTS

| | | |
|---|---|---|
| 3,573,152 A | 3/1971 | Wiley et al. ................... 161/60 |
| 3,968,056 A * | 7/1976 | Bolon ........................ 252/514 |
| 4,076,698 A | 2/1978 | Anderson et al. ......... 526/348.6 |
| 4,323,528 A | 4/1982 | Collins .......................... 264/53 |
| 4,798,081 A | 1/1989 | Hazlitt et al. .................... 73/53 |
| 4,824,720 A | 4/1989 | Malone ....................... 428/294 |
| 5,008,204 A | 4/1991 | Stehling ....................... 436/85 |
| 5,055,438 A | 10/1991 | Canich ....................... 502/117 |
| 5,057,475 A | 10/1991 | Canich et al. .............. 502/104 |
| 5,089,321 A | 2/1992 | Chum et al. ................ 428/218 |
| 5,160,457 A | 11/1992 | Elsenbaumer ............... 252/500 |
| 5,171,937 A | 12/1992 | Aldissi ......................... 174/36 |
| 5,179,171 A * | 1/1993 | Minami ....................... 525/288 |
| 5,206,459 A | 4/1993 | Aldissi ......................... 174/36 |
| 5,232,631 A | 8/1993 | Cao et al. .................... 252/500 |
| 5,244,996 A | 9/1993 | Kawasaki et al. ........... 526/347 |
| 5,246,783 A | 9/1993 | Spenadel et al. ............ 428/461 |
| 5,262,591 A | 11/1993 | Aldissi ......................... 174/36 |
| 5,272,236 A | 12/1993 | Lai et al. ................... 526/348.5 |
| 5,272,872 A | 12/1993 | Grutter et al. ................ 60/274 |
| 5,322,728 A | 6/1994 | Davey et al. ............... 428/286 |
| 5,347,024 A | 9/1994 | Nickias et al. ................. 556/11 |
| 5,378,402 A | 1/1995 | Cross et al. ................. 252/500 |

(List continued on next page.)

FOREIGN PATENT DOCUMENTS

| | | | |
|---|---|---|---|
| EP | 085438 | 2/1983 | ........... C08L/25/08 |
| EP | 0297364 A1 | 6/1988 | ........... C08K/3/04 |
| EP | 0416815 A2 | 3/1991 | ........... C08F/10/00 |
| EP | 0468651 A1 | 1/1992 | ............. C08F/4/74 |
| EP | 0514828 A1 | 11/1992 | ............. C07F/7/28 |
| GB | 2300860 A | 11/1996 | ........... C08K/3/00 |
| WO | 93/25608 | 12/1993 | ............. C08J/9/12 |
| WO | 94/00500 | 1/1994 | ........... C08F/10/00 |
| WO | 95/32095 | 11/1995 | ........... B32B/27/32 |

OTHER PUBLICATIONS

Y. Wilson Cheung and Martin J. Guest, Plastics–Racing Into Future (Proceedings of the SPE 54$^{th}$ Annual Technical Conference and Exhibits), "Structure, Thermal, Transitions and Mechanical Properties of Ethylene/Styrene Copolymers", pp. 1634–1637, (1996).

James C. Randall, Polymer Sequence Determination Carbon–13 NMR Method, "Statistical Analyses of Monomer Distributions and Number–Average Sequence Links", Academic Press, pp. 71–93, (1977).

Primary Examiner—Paul R. Michl

(57) ABSTRACT

A blend of polymeric materials comprising
(A) of from about 1 to about 99.99 weight percent based on the combined weights of Components A, B and C of at least one substantially random interpolymer; and wherein said interpolymer;
(1) contains of from about 0.5 to about 65 mole percent of polymer units derived from;
(a) at least one vinyl or vinylidene aromatic monomer, or
(b) at least one hindered aliphatic or cycloaliphatic vinyl or vinylidene monomer, or
(c) a combination of at least one vinyl or vinylidene aromatic monomer and at least one hindered aliphatic or cycloaliphatic vinyl or vinylidene monomer;
(2) contains of from about 35 to about 99.5 mole percent of polymer units derived from at least one aliphatic α-olefin having from 2 to 20 carbon atoms;
(3) has a molecular weight (Mn) greater than about 1,000;
(4) has a melt index ($I_2$) of from about 0.01 to about 1,000;
(5) has a molecular weight distribution ($M_w/M_n$) of from about 1.5 to about 20; and
(B) of from about 99 to about 0.01 weight percent based on the combined weights of Components A, B, and C of one or more conductive additives and/or one or more additives with high magnetic permeability ; and
(C) of from 0 to about 98.99 weight percent based on the combined weights of Components A, B, and C of one or more polymers other than A.

29 Claims, 2 Drawing Sheets

U.S. PATENT DOCUMENTS

| | | |
|---|---|---|
| 5,460,818 A | 10/1995 | Park et al. .................. 426/415 |
| 5,644,017 A | 7/1997 | Drumright et al. ......... 528/196 |
| 5,652,315 A | 7/1997 | Inoue et al. ................ 526/153 |
| 5,658,998 A * | 8/1997 | Minami ...................... 526/281 |
| 5,703,187 A | 12/1997 | Timmers .................... 526/282 |
| 5,846,652 A * | 12/1998 | Yamashita .................. 428/349 |

* cited by examiner

A - Conductive Paint of Area "A" cm$^2$
B - Sample Thickness (cm)
C - DC Resistance ($\Omega$)

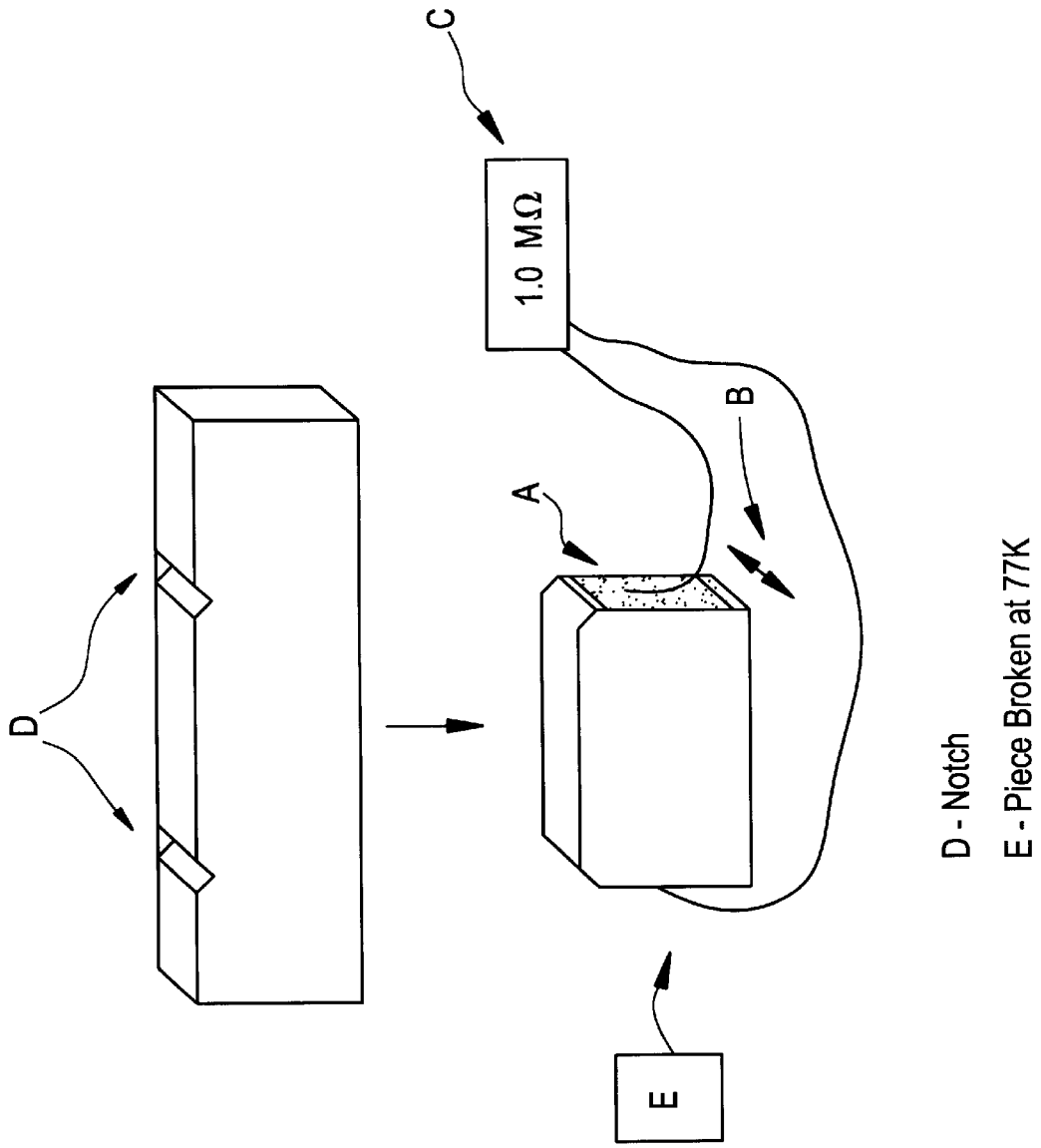

COMPOSITIONS OF INTERPOLYMERS OF α-OLEFIN MONOMERS WITH ONE OR MORE VINYL OR VINYLIDENE AROMATIC MONOMERS AND/OR ONE OR MORE HINDERED ALIPHATIC OR CYCLOALIPHATIC VINYL OR VINYLIDENE MONOMERS BLENDED WITH A CONDUCTIVE ADDITIVE

CROSS-REFERENCE TO RELATED APPLICATIONS.

This application claims the benefit of U.S. Provisional Application No. 60/062,305 filed Oct. 17, 1997.

STATEMENT REGARDING FEDERALLY SPONSORED RESEARCH OR DEVELOPMENT.

Not Applicable.

BACKGROUND OF THE INVENTION

This invention relates to compositions of interpolymers of α-olefin monomers with one or more vinyl or vinylidene aromatic monomers and/or one or more hindered aliphatic or cycloaliphatic vinyl or vinylidene monomers blended with one or more conductive additives and, optionally one or more additional polymers.

The generic class of materials of α-olefin/vinyl or vinylidene monomer substantially random interpolymers, (including interpolymers of α-olefin/vinyl aromatic monomers) and their preparation, are known in the art, and are described in EP 416 815 A2.

The structure, thermal transitions and mechanical properties of substantially random interpolymers of ethylene and styrene containing up to about 50 mole percent styrene have been described (Y. W. Cheung, M. J. Guest; Proc. Antec '96 pages 1634–1637). The interpolymers were found to have glass transitions in the range −20° C. to +35° C., and had no measurable crystallinity above about 25 mole percent styrene incorporation, i.e. they are essentially amorphous.

Materials such as substantially random ethylene/styrene interpolymers offer a wide range of material structures and properties which makes them useful for varied applications, such as asphalt modifiers or as compatibilizers for blends of polyethylene and polystyrene (as described in U.S. Pat. No. 5,460,818.) Although of utility in their own right, industry is constantly seeking to improve the applicability of these interpolymers. To perform well in certain applications, these interpolymers could be desirably improved, for example, in the areas of electrical conductivity and/or magnetic permeability.

The ability to impart either electrical conductivity or magnetic permeability to materials can be an important factor in a number of applications. For instance the property attribute of semiconductivity (about $10^{-9}$ to $10^{-2}$ S/cm) in a material enhances its use in applications which require electrostatic painting, electronics manufacturing and shipping, conductive fibers for antistatic carpet and clothing, antistatic flooring, and also for semiconductive films. Higher levels of conductivity are also required in applications such as cable shielding, resettable fuses, EMI shielding, and direct electroplating onto plastics. In general, the key issues for conductive modification of existing materials are the maintenance of acceptable properties in the host material and minimization of the amount of conductive additive required to add the conductivity which can also be an issue for cost.

Magnetic permeability is a desirable feature in applications such as electromagnetic wave attenuation, that is, shielding of electrical equipment and circuits in numerous electrical devices from the deleterious effects of electromagnetic interference (EMI) present in the environment. EMI shielding is also important in containing the EMI within the EMI generating source as dictated by the specifications for electrical equipment imposed by both Government and private industry.

We have now found that interpolymers of α-olefin monomers with one or more vinyl or vinylidene aromatic monomers and/or one or more hindered aliphatic or cycloaliphatic vinyl or vinylidene monomers become semielectrically conductive (about $10^{-9}$ to $10^{-2}$ S/cm) by melt or solution blending low loadings of a conductive additive such as conductive carbon. We have also found that such interpolymers become significantly conductive (>0.01 S/cm) when larger amounts of conductive additives are incorporated.

We have also found that the combination of relatively small amounts of interpolymers of α-olefin monomers with one or more vinyl or vinylidene aromatic monomers and/or one or more hindered aliphatic or cycloaliphatic vinyl or vinylidene monomers, a conductive additive, and an additional polymer can enhance the conductivity of the blend in comparison to the cases where there is no interpolymer, when all other factors such as conductive additive level and processing parameters are held constant.

We have also found that this enhancement can bring the conductivity to the surface of the composite under conditions which may otherwise yield an insulating surface.

Finally, we have found that the use of two or more interpolymers of α-olefin monomers with one or more vinyl or vinylidene aromatic monomers and/or one or more hindered aliphatic or cycloaliphatic vinyl or vinylidene monomers which have differing vinyl or vinylidene monomer contents can also significantly enhance the conductivity both at the surface and throughout the bulk of the composite.

In yet another aspect of the present invention, the interpolymers of α-olefin monomers with one or more vinyl or vinylidene aromatic monomers and/or one or more hindered aliphatic or cycloaliphatic vinyl or vinylidene monomers can be mixed with intrinsically conductive polymers (ICP) such as certain appropriately doped polyanilines, to produce a relatively optically transmissive films having antistatic properties when, for example, cast from solution. Certain appropriately doped polyanilines (as described for instance in copending Provisional US Application filed on Oct. 15, 1997 entitled "Electrically-Conductive Polymers" by Susan J. Babinec et al., and herein incorporated by reference) appear to be miscible with the interpolymers of α-olefin monomers with one or more vinyl or vinylidene aromatic monomers and/or one or more hindered aliphatic or cycloaliphatic vinyl or vinylidene monomers. These mixtures can produce a clear, rather than cloudy or opaque, film as a result of good miscibility such that discreet particles are not seen under a light microscope at magnifications as high as 500 X. Such effectively transparent films which are semiconductive and do not contain discreet particles are a much desired product, for example, for antistatic applications related to electronics manufacturing and shipping. The miscibility of certain polyanilines in the interpolymers of α-olefin monomers with one or more vinyl or vinylidene aromatic monomers and/or one or more hindered aliphatic or cycloaliphatic vinyl or vinylidene monomers is also an important feature in processes such as blowing foams, and films where fine microstructure is also critical.

BRIEF SUMMARY OF THE INVENTION

This invention relates to blends of polymeric materials comprising (A) of from about 1 to about 99.99 weight percent based on the combined weights of Components A, B and C of at least one substantially random interpolymer; and wherein said interpolymer;
  (1) contains of from about 0.5 to about 65 mole percent of polymer units derived from;
    (a) at least one vinyl or vinylidene aromatic monomer, or
    (b) at least one hindered aliphatic or cycloaliphatic vinyl or vinylidene monomer, or
    (c) a combination of at least one vinyl or vinylidene aromatic monomer and at least one hindered aliphatic or cycloaliphatic vinyl or vinylidene monomer;
  (2) contains of from about 35 to about 99.5 mole percent of polymer units derived from at least one aliphatic α-olefin having from 2 to 20 carbon atoms;
  (3) has a molecular weight (Mn) greater than about 1,000;
  (4) has a melt index ($I_2$) of from about 0.01 to about 1,000;
  (5) has a molecular weight distribution ($M_w/M_n$) of from about 1.5 to about 20;
  and
(B) of from about 99 to about 0.01 weight percent based on the combined weights of Components A, B, and C of one or more conductive additives and/or one or more additives with high magnetic permeability ; and
(C) of from 0 to about 98.99 weight percent based on the combined weights of Components A, B, and C of one or more polymers other than A.

BRIEF DESCRIPTION OF DRAWINGS

FIG. 2 is an illustration of the method of determining Core Conductivity.

DETAILED DESCRIPTION OF THE INVENTION

Figure 1:
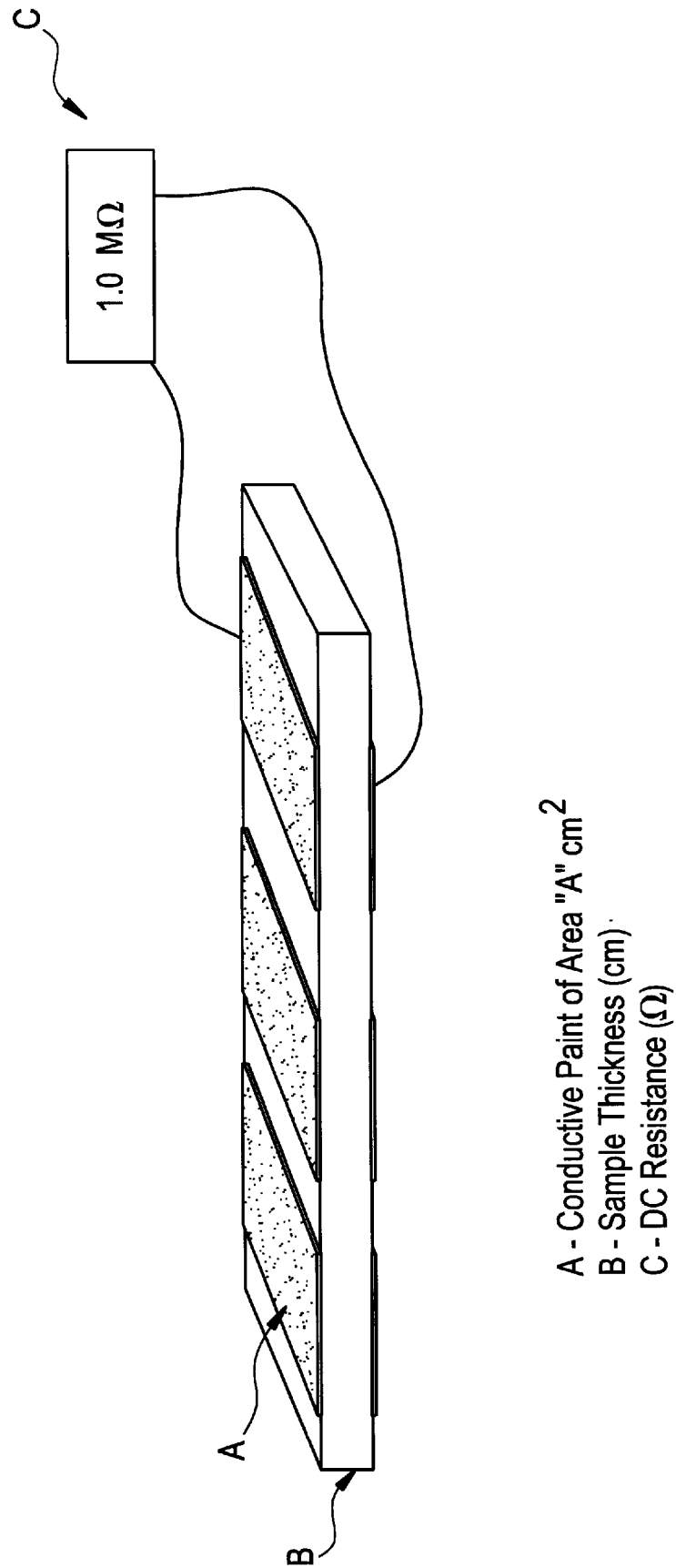
FIG. 1 is an illustration of the method of determining Surface Conductivity.

Definitions.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "copolymer" as employed herein means a polymer wherein at least two different monomers are polymerized to form the copolymer.

The term "interpolymer" is used herein to indicate a polymer wherein at least two different monomers are polymerized to make the interpolymer. This includes copolymers, terpolymers, etc.

The term "substantially random" in the substantially random interpolymer comprising an α-olefin and a vinyl or vinylidene aromatic monomer or hindered aliphatic or cycloaliphatic vinyl or vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer comprising an α-olefin and a vinyl or vinylidene aromatic monomer does not contain more than 15 percent of the total amount of vinyl or vinylidene aromatic monomer in blocks of vinyl or vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The Substantially Random Ethylene/Vinyl or Vinylidene Interpolymers.

The substantially random interpolymer blend components of the present invention include interpolymers prepared by polymerizing one or more α-olefins with one or more vinyl or vinylidene aromatic monomers and/or one or more hindered aliphatic or cycloaliphatic vinyl or vinylidene monomers.

Suitable α-olefins include for example, α-olefins containing from 2 to about 20, preferably from 2 to about 12, more preferably from 2 to about 8 carbon atoms. Particularly suitable are ethylene, propylene, butene-1,4-methyl-1-pentene, hexene-1 and octene-1. These α-olefins do not contain an aromatic moiety. Preferred are ethylene in combination with a $C_3-C_8$ α-olefin, more preferred is ethylene.

Other optional polymerizable ethylenically unsaturated monomer(s) include norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the interpolymers include, for example, those represented by the following formula:

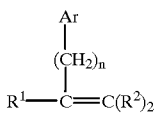

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero.

Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

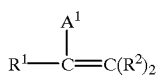

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate 5 comparable with ethylene polymerizations. However, simple linear α-olefins including for example, α-olefins containing from 3 to about 20 carbon atoms such as ethylene, propylene, butene-1, 4-methyl-1-pentene, hexene-1 or octene-1 are not examples of sterically hindered aliphatic or cycloaliphatic vinyl or vinylidene compounds.

Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred is hindered aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene.

The substantially random interpolymers may be modified by typical grafting, hydrogenation, functionalizing, or other reactions well known to those skilled in the art. The polymers may be readily sulfonated or chlorinated to provide functionalized derivatives according to established techniques. The substantially random interpolymers may also be modified by various chain extending or cross-linking processes including, but not limited to peroxide-, silane-, sulfur-, radiation-, or azide-based cure systems. A full description of the various cross-linking technologies is described in copending U.S. patent application Ser. No's 08/921,641 and 08/921,642 both filed on Aug. 27, 1997, the entire contents of both of which are herein incorporated by reference. Dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl or vinylidene aromatic interpolymers can also be prepared by the methods described in JP 07/278230 employing compounds shown by the general formula

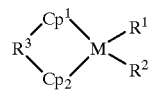

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxy groups, or aryloxy groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 by Francis J. Timmers et al. These interpolymers contain additional signals with intensities greater than three times the peak to peak noise. These signals appear in the chemical shift range 43.70–44.25 ppm and 38.0–38.5 ppm. Specifically, major peaks are observed at 44.1,43.9 and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one (α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/ vinyl aromatic monomer/ethylene tetrad will give rise to similar carbon$^{-13}$ NMR peaks but with slightly different chemical shifts.

These interpolymers are prepared by polymerizing at temperatures of from about −30° C. to about 250° C. in the presence of such catalysts as those represented by the formula

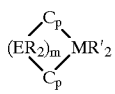

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each $R^1$ is independently, each occurrence, H, halo, hydrocarbyl, hydrocarbyloxy, silahydrocarbyl, hydrocarbylsilyl containing up to about 30 preferably from 1 to about 20 more preferably from 1 to about 10 carbon or silicon atoms or two $R^1$ groups together can be a $C_{1-10}$ hydrocarbyl substituted 1,3-butadiene; m is 1 or 2; and optionally, but preferably in the presence of an activating cocatalyst, particularly, suitable substituted cyclopentadienyl groups include those illustrated by the formula:

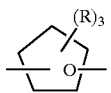

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-C1–4 alkyl, racemic-(dimethylsilanediyl)-bis-(2-methyl-4-phenylindenyl) zirconium di-C1–4 alkoxide, or any combination thereof and the like.

It is also possible to use the following titanium-based constrained geometry catalysts, [N-(1,1 -dimethylethyl)-1,1 -dimethyl-1 -[(1,2,3,4,5-η)-1,5,6, 7-tetrahydro-s-indacen-1 - yl]silanaminato(2-)-N]titanium dimethyl; (1 -indenyl) (tert-butylamido)dimethyl- silane titanium dimethyl; ((3-tert-butyl)(1,2,3,4,5 -η)-1 -indenyl)(tert-butylamido) dimethylsilane titanium dimethyl; and ((3-isopropyl) (1,2,3,4,5-η)-1 - indenyl)(tert-butyl amido) dimethylsilane titanium dimethyl, or any combination thereof and the like.

Further preparative methods for the substantially random α-olefin/vinylidene aromatic interpolymers blend components of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienylti-tanium trichloride ($CpTiCl_3$) to prepare an ethylene-styrene copolymer. Xu and Lin (*Polymer Preprints, Am. Chem. Soc. Div. Polym. Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. The manufacture of α-olefin/vinyl aromatic monomer interpolymers such as propylene/styrene and butene/styrene are described in United States patent number 5,244,996, issued to Mitsui Petrochemical Industries Ltd. or United States patent number 5,652,315 also issued to Mitsui Petrochemical Industries Ltd or as disclosed in DE 197 11 339 A1 to Denki Kagaku Kogyo KK. All the above methods disclosed for preparing the interpolymer component are incorporated herein by reference.

Also included as interpolymer blend components are $C_4$-$C_7$, isoolefin/para alkylstyrene interpolymers which are random copolymers of a $C_4$ to $C_7$ isomonoolefin, such as isobutylene and a para alkylstyrene comonomer, preferably para methylstyrene containing at least about 80%, more preferably at least about 90% by weight of the para isomer. These interpolymers also include functionalized interpolymers wherein at least some of the alkyl substituent groups present in the styrene monomer units contain halogen or some other functional group incorporated by nucleophilic substitution of benzylic halogen with other groups such as alkoxide, phenoxide, carboxylate, thiolate, thioether, thiocarbamate, dithiocarbamate, thiourea, xanthate, cyanide, malonate, amine, amide, carbazole, phthalamide, maleimide, cyanate and mixtures thereof.

Preferred materials may be characterized as isobutylene interpolymers containing the following monomer units randomly spaced along the polymer chain: These functionalized isomonoolefin interpolymers and their method of preparation are more particularly disclosed in U.S. Pat. No. 5,162,445, the complete disclosure of which is incorporated herein by reference.

Most useful of such functionalized materials are elastomeric, random interpolymers of isobutylene and para methylstyrene containing from about 0.5 to about 20 mole % para methylstyrene wherein up to about 60 mole % of the methyl substituent groups present on the benzyl ring contain a bromine or chlorine atom, preferably a bromine atom. These polymers have a substantially homogeneous compositional 5 distribution such that at least 95% by weight of the polymer has a para alkylstyrene content within 10% of the average para alkylstyrene content of the polymer. More preferred polymers are also characterized by a narrow molecular weight distribution ($M_w/M_n$) of less than about 5, more preferably less than about 2.5. The preferred viscosity average molecular weight is in the range of from about 200,000 up to about 2,000,000, and the preferred number average molecular weight is in the range of from about 25,000 to about 750,000, as determined by Gel Permeation Chromatography.

The interpolymers may be prepared by slurry polymerization of the monomer mixture using a Lewis Acid catalyst followed by halogenation, preferably bromination, in solution in the presence of halogen and a radical initiator such as heat and/or light and/or a chemical initiator.

Preferred interpolymers are brominated interpolymers which generally contain from about 0.1 to about 5 mole % of bromomethylgroups, most of which is monobromomethyl, with less than 0.05 mole % dibromomethyl substituents present in the copolymer. More preferred interpolymers contain from about 0.05 up to about 2.5 wt % of bromine based on the weight of the interpolymer, most preferably from about 0.05 to 0.75 wt % bromine, and are substantially free of ring halogen or halogen in the polymer backbone chain. These interpolymers, their method of preparation, their method of cure and graft or functionalized polymers derived therefrom are more particularly disclosed in the above referenced U.S. Pat. No. 5,162,445. Such interpolymers are commercially available from Exxon Chemical under the tradename Exxpro™ Speciality Elastomers.

Crosslinked Interpolymers.

One or more dienes can optionally be incorporated into the interpolymer to provide functional sites of unsaturation on the interpolymer which are useful, for example, to participate in crosslinking reactions. While conjugated dienes such as butadiene, 1,3-pentadiene (that is, piperylene), or isoprene may be used for this purpose, nonconjugated dienes are preferred. Typical nonconjugated dienes include, for example the open-chain nonconjugated diolefins such as 1,4-hexadiene (see U.S. Pat. No. 2,933, 480) and 7-methyl-1,6-octadiene (also known as MOCD); cyclic dienes; bridged ring cyclic dienes, such as dicyclopentadiene (see U.S. Pat. No. 3,211,709); or alkylidenenorbornenes, such as methylenenorbornene or ethylidenenorbornene (see U.S. Pat. No. 3,151,173). The nonconjugated dienes are not limited to those having only two double bonds, but rather also include those having three or more double bonds.

The diene is incorporated in the interpolymers of the invention in an amount of from 0 to 15 weight percent based on the total weight of the interpolymer. When a diene is employed, it will preferably be provided in an amount of at least 2 weight percent, more preferably at least 3 weight percent, and most preferably at least 5 weight percent, based on the total weight of the interpolymer. Likewise, when a diene is employed, it will be provided in an amount of no more than 15, preferably no more than 12 weight percent based on the total weight of the interpolymer.

Conductive Additive.

Conductive additives can differ by various parameters including chemical nature, particle shape e.g. fiber strand vs. spherical particle vs. flat platelet, particle size and size distribution, specific surface area, surface tension, color, optical density in the visible spectrum, degree of electrical conductivity, glass transition temperature ($T_g$), thermal stability, solubility, chemical reactivity, environmental stability, density and bulk density, and hydrophilicity.

For conductive blend compositions, important blend properties which need to be balanced are; conductivity, melt rheology/dispersability (for processability), impact properties, mechanical strength, water adsorption, homogeneity, cost, dielectric strength, gloss, aesthetics, abrasion and wear resistance, glass transition temperature range, filler adhesion to the matrix. In addition, for semi-conducting blend compositions important properties will also include optical transmissivity, chemical resistance, insensitivity to changes in relative humidity. Any particular balance of blend properties will depend upon the specific end-use application, and will, in part, dictate the choice of conductive additive.

1) Electrically Conductive Additives a) Conductive Carbon Blacks

The electrically conductive additives include but are not limited to all the known types of conductive carbon blacks. There are a wide variety of carbon blacks which all have a certain level of conductivity, produced industrially and otherwise, by a Variety of different processes. However, the "conductive carbons" referred to in this text are those which allow good development of conductivity when blended into certain binders. Typically, the conductive carbon blacks have a high or very high level of structure as measured by several tests. Primary particle size and carbon microstructure is evaluated with a transmission electron micrograph (TEM). Carbon blacks having high structure tend to show distinct linkages and a low number of isolated aggregates under TEM observation. Additionally, oil absorption used in accordance to ASTM D 2314 provides numerical values of the interstitial cavity volume. Carbon blacks which are considered conductive for the purposes described herein are those having relatively high oil absorption, typically greater than 500%, preferably greater than 400 %.

Aggregation is another parameter which is related to carbon structure, and is estimated according to dibutyl phthalate (DBP) adsorption. Conductive carbon blacks which are useful for the purposes of this invention are those including but not limited to carbon blacks having a DBP adsorption value greater than about 100 ml/100 g, preferably greater than about 70 ml/100 g. Tapped density (DIN ISO 787/11) also estimates the degree of structure. Conductive carbons, for the purposes of this invention, include but are not limited to those having a tapped density of less than about 500 g/l. Another very important value is the proportion of polar groups on the surface of the carbon. Polar groups reduce the electrical conductivity. The level of polar surface groups is a parameter which is easily determined as the percent volatiles, and is measured according to ASTM D 1620. Conductive carbon blacks useful for this invention include but are not limited to those having less than 2 wt. % volatiles. Conductivity is also related to the level of contaminants (for example ash, sulfur, various transition metals and the like) in the conductive carbon, and their concentration generally needs to be less than 20 ppm in carbon blacks having good conductivity.

It is also well known in the art that the details of melt and solution processing can significantly effect the conductivity of a polymer or polymer blend with a conductive additive. These effects are especially significant for the dispersion of conductive carbon blacks into a polymer since the conductive carbon black structure decreases nearly continuously with the total shear energy deposited into the system during blending, and since the conductivity requires contact between conductive additive materials. Additionally, some conductive carbon blacks can be surface-treated for improved dispersion. For purposes of these teachings it is understood that comparisons between samples are made under processing conditions which approximate nearly equivalent total shear energy in the blended system. Similarly, it is known that cooling kinetics can affect conductivity of the composites.

b) Intrinsically-Conductive Polymers (ICP).

Also included as an electronically conductive additive in the compositions of the present invention are the doped and undoped conjugated intrinsically electrically conductive oriented or unoriented, amorphous and semicrystalline polymers such as substituted and unsubstituted polyanilines, polyacetylenes, polypyrroles, poly(phenylene sulfides), polyindoles, polythiophenes and poly(alkyl) thiophenes, polyphenylenes, polyvinylene/phenylenes, and their copolymers such as random or block copolymers of for example, acetylenes and thiophenes or anilines and thiophenes. Also included are derivatives thereof such as poly(N-methyl) pyrrole, poly(o-ethoxy)aniline, polyethylene dioxythiophene (PEDT), and poly (3-octyl)thiophene.

These materials are called "intrinsically-conductive polymers" or "ICP" and as used herein refers to a polymer with extended pi-conjugated groups which may be rendered conductive with a dopant such as a Lewis or Lowry-Bronsted acid or a redox agent to form a charge transfer complex with a conductivity of at least about $10^{-12}$ S/cm. The charge transfer may be full or partial, depending on the specific electron donor/electron acceptor pair. For example, partial charge transfer between certain lithium salts and polyaniline has been found to increase the conductivity of the polyaniline. Full charge transfer is believed to occur with polyaniline and protons, and polythiophene and protons or transition metals. The process of rendering the polymer electronically conductive is referred to herein as "doping". ICPs which have been rendered conductive and have not been rendered conductive are referred to herein as "doped" ICPs and "undoped" ICPs, respectively. The compounds and polymers which may be used in such doping processes to render the ICPs conductive are referred to herein as "dopants".

When low cost and high temperature stability are important the ICP is preferably a polyaniline, polypyrrole, or polythiophene, but is most preferably a polyaniline. However, if the ICP is used to prepare a composite with a thermoplastic or thermoset polymer, the choice of ICP may also depend on its compatibility with such polymer. For example, polypyrrole is especially compatible with polymers with which it can form hydrogen bonds along its backbone; polyalkylthiophenes are particularly compatible with polyolefins and polystyrene; and polyacetylenes are particularly compatible with polyolefins.

Polyaniline can occur in several different oxidative states such as leucoemeraldine, protoemeraldine, emeraldine, nigraniline, and pemigraniline, depending on the ratio of amine groups to imine groups present in the backbone of the polymer. In addition, each oxidative state may or may not be protonated. For example, the emeraldine salt form of polyaniline, in which about 50 percent of the nitrogen atoms are contained in imine groups and are protonated, is a very conductive and stable form of a protonated polyaniline. The nonconductive base of this oxidative state is blue in color, while the protonated form (emeraldine salt) is green.

The ICP may be doped by any suitable method. The effectiveness of the various doping methods and the conductivity of the doped ICP obtained thereby may vary depending on the doping method, the particular ICP, the particular dopant(s), and the point in a composite fabrication process at which the ICP is doped (if the ICP is used to prepare a composite). The ICP may be doped, for example, by mixing a solution, melt, or dispersion of the dopant(s) with the ICP either in solution or with the ICP in the solid state, contacting a solid ICP with solid dopant(s) (solid state doping), by contacting a solid ICP with dopant(s) in vapor form, or any combination of these.

In general, polyaniline will reach a maximum conductivity when it is supplied in an amount sufficient to dope about 50 mole percent of the available sites. Other types of ICPs will typically reach a maximum conductivity at a somewhat lower level of doping such as, for example, about 30 mole percent of the available sites for polypyrroles and polythiophenes. The molar amount of dopant necessary to reach the maximum conductivity for the ICP will depend on: (1) the particular ICP utilized, (2) its chemical purity, and (3) the physical distribution of the dopant within the ICP matrix. Preferably, the amount of dopant utilized does not greatly exceed the amount which is needed to dope the polymer for cost reasons, and because the excess dopant may have an exceptionally large tendency to leach out of the composite containing the doped polymer and excess dopant.

Examples of suitable dopants for polyaniline and other ICPs include any salt, compound, or polymer capable of introducing a charged site on the polymer, including both partial and full-charge transfer such as, Lewis acids, Lowry-Bronsted acids, and certain alkali metal salts such as lithium tetrafluoroborate, and transition metal salts such as gold, iron, and platinum chlorides; and other redox agents having a sufficiently oxidizing oxidative couple to dope the polymer; alkyl or aryl halides; and acid anhydrides. Not all of the dopants listed above will dope each type of ICP; however, appropriate dopants for the ICPs listed above are known in the art or may be readily determined experimentally.

Examples of dopants which are alkylation agents include those corresponding to the formula R–X, wherein R is a $C_{1-20}$ hydrocarbyl group containing one or more alkyl, aryl, or benzyl substituents, and X is Cl, Br, or I. Examples of such alkylation agents include methyl iodide and benzyl bromide. Other examples of suitable alkylation agents include those corresponding to the formula $R^1$–X, wherein $R^1$ is polystyrene, poly(ethylene-styrene), and X is Cl, Br, or I. Examples include halomethylated polystyrene or poly (ethylene-styrene), and brominated copolymer of para-methylstyrene and isobutylene (available from Exxon as ExxPro).

Examples of suitable dopants which are acid anhydrides include maleic anhydride, phthalic anhydride, and acetic anhydride. Other examples include acid anhydrides such as an alternating copolymer of maleic anhydride and 1-octadecene (available from Aldrich Chemical), copolymers of maleic anhydride and styrene, and maleic anhydride-grafted polymers such as polyethylene-grafted maleic anhydride.

Examples of suitable dopants which are Lewis acids and Lowry-Bronsted acids include those described in U.S. Pat. No. 5,160,457, the "functionalized protonic acids" described in U.S. Pat. 5,232,631 and the "polymeric dopants" described in U.S. Pat. No. 5,378,402, all of which are hereby incorporated by reference. Specific examples of such acids include all organic sulfonic and carboxylic acids, such as dodecylbenzenesulfonic acid, toluenesulfonic acids, hydroxybenzenesulfonic acid (HBSA), picric acid, m-nitrobenzoic acids, dichloroacetic acid. In addition, acids such as hydrogen chloride, sulfuric acid, nitric acid, $HClO_4$, $HBF_4$, $HPF_6$, HF, phosphoric acids selenic acid, boronic acid, can also be used as can inorganic clusters of polyoxometallates.

Examples of polymeric dopants include polymers having terminal or pendant carbon-, phosphorous-, or sulfur-containing acid groups, and salts and esters thereof, or mixtures thereof. Specific examples include ethylene/acrylic acid copolymers, polyacrylic acids, ethylene/methacrylic acid copolymers, carboxylic acid- or sulfonic acid-functional polystyrene, polyalkylene oxides, and polyesters; and graft copolymers of polyethylene or polypropylene and acrylic acid or maleic anhydride as well as mixtures thereof; sulfonated polycarbonates, sulfonated ethylene-propylene-diene terpolymers (EPDM), sulfonated ethylene-styrene copolymers, polyvinylsulfonic acid, sulfonated poly (phenylene oxide), and sulfonated polyesters such as polyethylene terephthalate; as well as the certain alkali metal and transition metal, salts of such acids, preferably the lithium, manganese, and zinc salts of such acids. Sulfonated polycarbonates may be prepared, for example, by the methods described in U.S. Pat. No. 5,644,017 and U.S. patent application Ser. No. 08/519,853, filed Aug. 25, 1995, entitled "A Novel Aromatic Sulfonated Diester Monomer, Process to Synthesize, Polymer Derived Therefrom and Method to Prepare Said Polymer", which is herein incorporated by reference.

c) Conductive Metals and Alloys.

Also included as conductive additives in the blend compositions of the present invention are metals and alloys including but not limited to iron, nickel, steel, aluminum, copper, zinc, lead, bronze, brass, zirconium, tin, silver, and gold. These can be in the form of powders, fibres, flakes, or metallized coatings onto substrates such as carbon fibres, glass beads, polymer beads, talcs, or ceramic beads.

d) Semiconductors and Conducting Inorganic Compounds.

Also included as conductive additives in the blend compositions of the present invention are semiconductors including but not limited to doped and undoped metal oxides and nitrides. Compounds which are frequently used commercially include, but are not limited to, tin oxide, indium doped tin oxide, antimony doped tin oxide (for example and SN-100P supplied by the Nagase America Corporation, New York) and the titanium dioxide ($TiO_2$)-coated with antimony doped tin oxides having a core and a rutile type acicular shape (for example FT-1000, FT-2000, FT-3000) or a spherical shape (for example ET-300W, ET-500W also supplied by the Nagase America Corporation), indium oxide and tin-doped indium oxide, fluorine doped tin oxide, zinc oxide, and cadmium stannate, tantalum oxide, and aluminum nitride and doped titanium dioxide. As conductive additives these materials can be used as particles, fibres, flakes, or coatings onto substrates such as carbon fibres, glass beads, polymer beads, talcs, ceramic beads, and ferromagnetic particles.

e) Conductive Polymer Electrolytes.

Polymer electrolytes are a class of ionically conductive solids, which may in some cases have sufficient mechanical and electrical properties to be of commercial use. Many polar polymers are found to form complexes with metal salts and reach useful conductivity values, with mainly $LiClO_4$, $LiCF_3SO_3$, $LiAsF_6$, $NaClO_4$, $NiBr_2$, and Ag salts. In addition to the polymer/metal salt complexes there may be an amount of plasticizers which enhance the conductivity, including but not limited to polyethylene glycoldimethylether (PEGDME) especially in PEO, and polyethylene glycol and glycoldimethyl ether, and residual solvents such as water, THF, and alcohols. Representatives polymers of such polymer/metal salt complexes are poly(ethylene oxide) (PEO), crosslinked poly(ethylene oxide), poly(ethylene glycol/siloxane), which may or may not be crosslinked, poly(proplyene oxide) (PPO), poly(ethylene succinate) (PES), poly(aziridine), poly(N-methylaziridine), poly (methyllene sulfide), poly(bis-methoxy-ethoxy-ethoxy) phosphazene, poly(ethylene adipate), poly(oligo oxyethylene) methacrylate, poly(propiolactone), poly (dioxolane-co-trioxymethylene), poly(fluoro)sulfonic acid such as those commercially available from Du Pont under the trade name Nafion™.

f) Other Conductive Additives.

Also included as conductive additives in the blend compositions of the present invention are the chopped or non-chopped carbon and graphite fibers, graphite, cotton fiber braid on a graphite impregnated glass layer, particulate fillers of a given structure, for example the perovskite and spinel structures, metallized particles, platelet-shaped conductive particles, and may also include some photoconductive additives, such as zinc oxide. Also included are antistatic agents which can be added separately, or in combination. Examples of antistatic agents include, but are not limited to, the alkyl amines, such as ARMOSTAT™410, ARMOSTAT™450, ARMOSTAT™475, all commercially available from Akzo Nobel Corporation; quaternary ammonium compounds, such as MARKSTAT™ which is commercially available from The Argus Corporation, and salts such as $LiPF_6$, $KPF_6$, lauryl pyridinium chloride, and sodium cetyl sulphate, which can be purchased from any ordinary chemical catalog, glycerol esters, sorbitan esters, ethoxylated amines.

2) High Magnetic Permeability Additives

In addition to electrical conductivity, the conductive additive may or may not have a high magnetic permeability, for example iron is both electrically conductive and has a high magnetic permeability, while copper has high conductivity but low magnetic permeability. For the purposes of this invention the phrase "high magnetic permeability" means a magnetic permeability of about twenty times greater, preferably about a hundred times greater than that of copper. Magnetic particles are known to have superior electromagnetic wave adsorption characteristics, based on well established electromagnetic wave theories.

Some of these materials have also found a degree of use commercially. For example, recent patents (U.S. Pat. Nos. 5,206,459; 5,262,591, and 5,171,937 all by M. Aldissi of the Champlain Cable Corporation and herein incorporated by reference) have described the exceptionally facile dispersion of ferrite particles within polymeric matrices. The ferromagnetic particles may be irregularly or spherically shaped. It has been suggested, however, that spherically shaped particles produce a composite matrix which has better electromagnetic adsorption characteristics in comparison to composites based on particles having irregular shapes. Additionally, the ferromagnetic particles may or may not be coated with a conductive metal layer, including, but not limited to, coatings of Cu and Ag. In general the magnetic particles may include, but are not limited to, magnetite, ferric oxide ($Fe_3O_4$), MnZn ferrite, and silver-coated manganese-zinc ferrite particles. Magnetic particles are manufactured by various companies such as Fair-Rite Products Corporation of N.Y., and the Steward Manufacturing Company of Tennessee. Metal coatings on these particles (such as silver) are provided by companies such as Potters Industries Inc. of Parsippany, N.J.

The Other Polymer Component (Component C).

The increase in electrical conductivity or magnetic permeability observed on adding a conductive additive to the substantially random α-olefin/vinyl or vinylidene interpolymers can also be observed in the presence of one or more other polymer components which span a wide range of compositions.

The α-Olefin Homonolymers and Interpolymers

The α-olefin homopolymers and interpolymers comprise polypropylene, propylene/$C_4$–$C_{20}$ α-olefin copolymers, polyethylene, and ethylene/$C_3$–$C_{20}$ α-olefin copolymers, the interpolymers can be either heterogeneous ethylene/α-olefin interpolymers or homogeneous ethylene/α-olefin interpolymers, including the substantially linear ethylene/α-olefin interpolymers. Also included are aliphatic α-olefins having from 2 to 20 carbon atoms and containing polar groups.

Also included in this group are olefinic monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate, or ethylene-vinyl acetate copolymers (EVA) etc.; ethylenically unsaturated dicarboxylic acid imides such as N-alkyl or N-aryl maleimides such as N-phenyl maleimide, etc. Preferably such monomers containing polar groups are EVA, acrylic acid, vinyl acetate, maleic anhydride and acrylonitrile.

Heterogeneous interpolymers are differentiated from the homogeneous interpolymers in that in the latter, substantially all of the interpolymer molecules have the same ethylene/comonomer ratio within that interpolymer, whereas heterogeneous interpolymers are those in which the interpolymer molecules do not have the same ethylene/comonomer ratio. The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks) by DSC. The heterogeneous interpolymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

The Ziegler catalysts suitable for the preparation of the heterogeneous component of the current invention are typical supported, Ziegler-type catalysts. Examples of such compositions are those derived from organomagnesium compounds, alkyl halides or aluminum halides or hydrogen chloride, and a transition metal compound. Examples of such catalysts are described in U.S. Pat. Nos. 4,314,912 (Lowery, Jr. et al.), 4,547,475 (Glass et al.), and 4,612,300 (Coleman, III), the teachings of which are incorporated herein by reference.

Suitable catalyst materials may also be derived from a inert oxide supports and transition metal compounds. Examples of such compositions are described in U.S. Pat. No. 5,420,090 (Spencer. et al.), the teachings of which are incorporated herein by reference.

The heterogeneous polymer component can be a homolymer of ethylene or an α-olefin preferably polyethylene or polypropylene, or, preferably, an interpolymer of ethylene with at least one $C_3$–$C_{20}$ α-olefin and/or $C_4$–$C_{18}$ dienes. Heterogeneous copolymers of ethylene, and propylene, 1-butene, 1-hexene, 4-methyl-1-pentene and 1-octene are especially preferred.

The relatively recent introduction of metallocene-based catalysts for ethylene/α-olefin polymerization has resulted in the production of new ethylene interpolymers known as homogeneous interpolymers.

The homogeneous interpolymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 4,798,081 (Hazlitt et al.), or as is described in U.S. Pat. No. 5,008,204 (Stehling), the disclosure of which is incorporated herein by reference. The technique for calculating CDBI is described in U.S. Pat. No. 5,322,728 (Davey et al. ) and in U.S. Pat. No. 5,246,783 (Spenadel et al.). or in U.S. Pat. No. 5,089,321 (Chum et al.) the disclosures of all of which are incorporated herein by reference. The SCBDI or CDBI for the homogeneous interpolymers used in the present invention is preferably greater than about 30 percent, especially greater than about 50 percent.

The homogeneous interpolymers used in this invention essentially lack a measurable "high density" fraction as measured by the TREF technique (i.e., the homogeneous ethylene/α-olefin interpolymers do not contain a polymer fraction with a degree of branching less than or equal to 2 methyls/1000 carbons). The homogeneous interpolymers also do not contain any highly short chain branched fraction (i.e., they do not contain a polymer fraction with a degree of branching equal to or more than 30 methyls/1000 carbons).

The substantially linear ethylene/α-olefin polymers and interpolymers blend components of the present invention are also homogeneous interpolymers but are further herein defined as in U.S. Pat. No. 5,272,236 (Lai et al.), and in U.S. Pat. No. 5,272,872, the entire contents of which are incorporated by reference. Such polymers are unique however due to their excellent processability and unique rheological properties and high melt elasticity and resistance to melt fracture. These polymers can be successfully prepared in a continuous polymerization process using the constrained geometry metallocene catalyst systems.

The term "substantially linear" ethylene/α-olefin interpolymer means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least one carbon more than two carbons less than the total number of carbons in the comonomer, for example, the long chain branch of an ethylene/octene substantially linear ethylene interpolymer is at least seven (7) carbons in length (i.e., 8 carbons less 2 equals 6 carbons plus one equals seven carbons long chain branch length). The long chain branch can be as long as about the same length as the length of the polymer back-bone. Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference. Long chain branching, of course, is to be distinguished from short chain branches which result solely from incorporation of the comonomer, so for example the short chain branch of an ethylene/octene substantially linear polymer is six carbons in length, while the long chain branch for that same polymer is at least seven carbons in length.

The catalysts used to prepare the homogeneous interpolymers for use as blend components in the present invention are metallocene catalysts. These metallocene catalysts include the bis(cyclopentadienyl)-catalyst systems and the mono(cyclopentadienyl) Constrained Geometry catalyst systems (used to prepare the substantially linear ethylene/α-olefin polymers). Such constrained geometry metal complexes and methods for their preparation are disclosed in U.S. application Ser. No. 545,403, filed Jul. 3, 1990 (EP-A-416,815); U.S. application Ser. No. 547,718, filed Jul. 3, 1990 (EP-A-468,651); U.S. application Ser. No. 702,475, filed May 20, 1991 (EP-A-514,828); as well as U.S. Pat. No. 5,055,438, U.S. Pat. No. 5,057,475, U.S. Pat. No. 5,096,867, U.S. Pat. No. 5,064,802, U.S. Pat. No. 5,132,380, U.S. Pat. No. 5,721,185, U.S. Pat. No. 5,374,696 and U.S. Pat. No. 5,470,993. For the teachings contained therein, the aforementioned pending United States Patent applications, issued United States Patents and published European Patent Applications are herein incorporated in their entirety by reference thereto.

In EP-A 418,044, published March 20, 1991 (equivalent to U.S. Ser. No. 07/758,654) and in U.S. Ser. No. 07/758,660 certain cationic derivatives of the foregoing constrained geometry catalysts that are highly useful as olefin polymerization catalysts are disclosed and claimed. In U.S. Ser. No. 720,041, filed Jun. 24, 1991, certain reaction products of the foregoing constrained geometry catalysts with various boranes are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States Patent applications, issued United States Patents and published European patent applications are herein incorporated in their entirety by reference thereto.

The homogeneous polymer component can be an ethylene or α-olefin homopolymer preferably polyethylene or polypropylene, or, preferably, an interpolymer of ethylene with at least one $C_3$–$C_{20}$ α-olefin and/or $C_4$–$C_{18}$ dienes. Homogeneous copolymers of ethylene, and propylene, 1-butene, 1-hexene, 4-methyl-1-pentene and 1-octene are especially preferred.

2) Thermoplastic Olefins

Thermoplastic olefins (TPOs) are generally produced from blends of an elastomeric material such as ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. Generally, TPOs are characterized by a balance of stiffness (modulus) and low temperature impact, good chemical resistance and broad use temperatures. Because of features such as these, TPOs are used in many applications, including automotive facia and instrument panels, and also potentially in wire and cable.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7% ethylene copolymerized with the propylene), however, can also be used in the TPO formulations disclosed herein. In-reactor TPO's can also be used as blend components of the present invention. A complete discussion of various polypropylene polymers is contained in *Modern Plastics Encyclopedia*/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 35 g/10 min, preferably from about 0.5 g/10 min to about 25 g/10 min, and especially from about 1 g/10 min to about 20 g/10 min.

3) Styrene—Diene Copolymers

Also included are block copolymers having unsaturated rubber monomer units includes, but is not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and a-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Also included are random copolymers having unsaturated rubber monomer units includes, but is not limited to, styrene-butadiene (SB), styrene-isoprene(SI), α-methylstyrene-styrene-butadiene, α-methylstyrene-styrene-isoprene, and styrene-vinyl-pyridine-butadiene.

4) Styrenic Copolymers.

In addition to the block and random styrene copolymers are the acrylonitrile-butadiene-styrene (ABS) polymers, styrene-acrylonitrile (SAN), rubber modified styrenics such as high impact polystyrene, 5) Elastomers.

The elastomers include but are not limited to rubbers such as polyisoprene, polybutadiene, natural rubbers, ethylene/propylene rubbers, ethylene/propylene diene (EPDM) rubbers, thermoplastic polyurethanes, silicone rubbers, and 6) Thermoset Polymers.

The thermoset polymers include but are not limited to epoxies, vinyl ester resins, polyurethanes, phenolics and the like.

7) Vinyl Halide Polymers.

Vinyl halide homopolymers and copolymers are a group of resins which use as a building block the vinyl structure $CH_2=CXY$, where X is selected from the group consisting of F, Cl, Br, and I and Y is selected from the group consisting of F, Cl, Br, I and H.

The vinyl halide polymer component of the blends of the present invention include but are not limited to homopolymers and copolymers of vinyl halides with copolymerizable monomers such as α-olefins including but not limited to ethylene, propylene, vinyl esters of organic acids containing 1 to 18 carbon atoms, e.g. vinyl acetate, vinyl stearate and so forth; vinyl chloride, vinylidene chloride, symmetrical dichloroethylene; acrylonitrile, methacrylonitrile; alkyl acrylate esters in which the alkyl group contains 1 to 8 carbon atoms, e.g. methyl acrylate and butyl acrylate; the corresponding alkyl methacrylate esters; dialkyl esters of dibasic organic acids in which the alkyl groups contain 1–8 carbon atoms, e.g. dibutyl fumarate, diethyl maleate, and so forth.

Preferably the vinyl halide polymers are homopolymers or copolymers of vinyl chloride or vinylidene dichloride. Poly (vinyl chloride) polymers (PVC) can be further classified into two main types by their degree of rigidity. These are "rigid" PVC and "flexible" PVC. Flexible PVC is distinguished from rigid PVC primarily by the presence of and amount of plasticizers in the resin. Flexible PVC typically has improved processability, lower tensile strength and higher elongation than rigid PVC.

Of the vinylidene chloride homopolymers and copolymers (PVDC), typically the copolymers with vinyl chloride, acrylates or nitriles are used commercially and are most preferred. The choice of the comonomer significantly affects the properties of the resulting polymer. Perhaps the most notable properties of the various PVDC's are their low permeability to gases and liquids, barrier properties; and chemical resistance.

Also included are the various PVC and PVCD formulations containing minor amounts of other materials present to modify the properties of the PVC or PVCD, including but not limited to polystyrene, styrenic copolymers, polyolefins including homo and copolymers comprising polyethylene, and or polypropylene, and other ethylene/α-olefin copolymers, polyacrylic resins, butadiene-containing polymers such as acrylonitrile butadiene styrene terpolymers (ABS), and methacrylate butadiene styrene terpolymers (MBS), and chlorinated polyethylene (CPE) resins and the like.

Also included in the family of vinyl halide polymers for use as blend components of the present invention are the chlorinated derivatives of PVC typically prepared by post chlorination of the base resin and known as chlorinated PVC, (CPVC). Although CPVC is based on PVC and shares some of its characteristic properties, CPVC is a unique polymer having a much higher melt temperature range (410–450° C.) and a higher glass transition temperature (239–275° F.) than PVC.

8) Engineering Thermoplastics.

Engineering thermoplastics include but are not limited to poly(methylmethacrylate) (PMMA), nylons, poly(acetals), polystyrene (atactic and syndiotactic), polycarbonate, thermoplastic polyurethanes, polysiloxane, polyphenylene oxide (PPO), and aromatic polyesters.

Other Additives.

Other additives such as antioxidants (e.g., hindered phenols such as, for example, Irganox® 1010), phosphites (e.g., Irgafos® 168), U.V. stabilizers, cling additives (e.g., polyisobutylene), antiblock additives, colorants, pigments, fillers, and the like can also be included in the interpolymers employed in the blends of and/or employed in the present invention, to the extent that they do not interfere with the enhanced properties discovered by Applicants.

Preferred inorganic fillers are ionic inorganic materials. Preferred examples of inorganic fillers are talc, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres or chalk. Of these fillers, barium sulfate, talc, calcium carbonate, silica/glass, glass fibers, alumina and titanium dioxide, and mixtures thereof are preferred. The most preferred inorganic fillers are talc, calcium carbonate, barium sulfate, glass fibers or mixtures thereof. Additives such as fillers also play a role in the aesthetics of a final article providing a gloss or matte finish.

These additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. However, in the instance of fillers, they could be employed in amounts up to 90 percent by weight based on the weight of the polymer or polymer blend. The preferred amounts of inorganic filler depend on the desired end-use of the filled polymer compositions of the present invention.

For example, when producing floor, wall or ceiling tiles, the amount of the inorganic filler(s) (B) preferably is from about 50 to about 95 percent, more preferably from about 70 to about 90 percent, based on the total weight of (A) and (B). On the other hand, when producing floor, wall or ceiling sheetings, the amount of the inorganic filler(s) (B) preferably is from about 10 to about 70 percent, more preferably from about 15 to about 50 percent, based on the total weight of (A) and (B). For several applications filler contents of from about 40 to about 90 percent, more preferably from about 55 to about 85 percent, based on the total weight of (A) and (B), are preferred.

In addition, flow and dispersions aids for the conductive additive may be used including, titanates and zirconates, various processing oils and low molecular weight polymers and waxes such as poly(ethyleneoxide), and organic salts such as zinc and calcium stearate.

Preparation of and Applications for the Final Blend Compositions.

The interpolymers of α-olefin monomers with one or more vinyl or vinylidene aromatic monomers and/or one or more hindered aliphatic or cycloaliphatic vinyl or vinylidene monomers with the conductive or high magnetic permeability additive can be used alone, or as a masterbatch or concentrate for addition to other polymers, or as a coating for numerous applications. Such blends can be thermally or solution processed, and can be modified to have low or high conductivity, with the requisite level depending upon the particular application.

The compositions of the present invention can be prepared by any convenient method, including dry blending the individual components and subsequently melt mixing or melt compounding, either directly in the extruder or mill used to make the finished article (e.g., the automotive part), or by pre-melt mixing in a separate extruder or mill (e.g., a Banbury mixer), or by solution blending, or by compression molding, or by calendering. In addition to melt processing, solution processing can also be utilized. This includes but is not limited to mixing of dissolved polymers or of dispersions such as latexes and colloids.

There are many types of molding operations which can be used to form useful fabricated articles or parts from the present compositions, including casting from solution, thermoforming and various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference) and profile extrusion, sheet extrusion, film casting, coextrusion and multilayer extrusion, coinjection molding, lamination, film blowing.

The compositions of the present invention may be used to form expandable or foamable particles, moldable foam particles, or beads, and articles formed by expansion and/or coalescing and welding of those particles.

The compositions of the present invention may be used to form foam structures which may take any physical configuration known in the art, such as sheet, plank, profiles, rods or bun stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, *Handbook of Polymer Foams and Technology*, edited by D. Klempner and K. C. Frisch, Hanser Publishers, Munich, Vienna, New York, Barcelona (1991), which is incorporated herein by reference.

Foam structures may be made by a conventional extrusion foaming process. The structure is generally prepared by heating the compositions of the present invention to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

The present foam structures may be formed in a coalesced strand form by extrusion of the compositions of the present invention through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

The present foam structures may also be formed by an accumulating extrusion process as seen in U.S. Pat. No. 4,323,528, which is incorporated by reference herein. In this process, low density foam structures having large lateral cross-sectional areas are prepared by: 1) forming under pressure a gel of the compositions of the present invention and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structures may also be formed into non-crosslinked foam beads suitable for molding into articles. To make the foam beads, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

In a derivative of the above process, styrene monomer may be impregnated into the suspended pellets prior to impregnation with blowing agent to form a graft interpolymer with the compositions of the present invention. The polyethylene/polystyrene interpolymer beads are cooled and discharged from the vessel substantially unexpanded. The beads are then expanded and molded by the conventional expanded polystyrene bead molding process. The process of making the polyethylene/polystyrene interpolymer beads is described in U.S. Pat. No. 4,168,353, which is incorporated herein by reference.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. (Some of the methods are taught in U.S. Pat. Nos. 3,504,068 and 3,953,558.) Excellent teachings of the above processes and molding methods are seen in C. P. Park, supra, p. 191, pp. 197–198, and pp. 227–229, which are incorporated herein by reference.

Blowing agents useful in making the present foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1 difluoroethane (HCFC-142b), 1,1-dichloro-2,2,2-trifluoroethane (HCFC-123) and 1-chloro-1,2,2,2-tetrafluoroethane(HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-1 14), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N, N'-dinitrosoterephthalamide, and trihydrazino triazine. Preferred blowing agents include isobutane, HFC-152a, and mixtures of the foregoing.

The amount of blowing agents incorporated into the polymer melt material to make a foam-forming polymer gel is from about 0.2 to about 5.0, preferably from about 0.5 to about 3.0, and most preferably from about 1.0 to 2.50 gram moles per kilogram of polymer.

Foams may be perforated to enhance or accelerate permeation of blowing agent from the foam and air into the foam. The foams may be perforated to form channels which extend entirely through the foam from one surface to another or partially through the foam. The channels may be spaced up to about 2.5 centimeters apart and preferably up to about 1.3 centimeters apart. The channels are present over substantially an entire surface of the foam and preferably are uniformly dispersed over the surface. The foams may employ a stability control agent of the type described above in combination with perforation to allow accelerated permeation or release of blowing agent while maintaining a dimensionally stable foam. Excellent teachings to perforation of foam are seen in U.S. Pat. Nos. 5,424,016 and 5,585,058, which are incorporated herein by reference.

Various additives may be incorporated in the present foam structure such as stability control agents, nucleating agents, inorganic fillers, pigments, antioxidants, acid scavengers, ultraviolet absorbers, flame retardants, processing aids, extrusion aids, and the like.

A stability control agent may be added to the present foam to enhance dimensional stability. Preferred agents include amides and esters of $C_{10-24}$ fatty acids. Such agents are seen in U.S. Pat. Nos. 3,644,230 and 4,214,054, which are incorporated herein by reference. Most preferred agents include stearyl stearamide, glycerol monostearate, glycerol monobehenate, and sorbitol monostearate. Typically, such stability control agents are employed in an amount ranging from about 0.1 to about 10 parts per hundred parts of the polymer.

The present foam structure exhibits excellent dimensional stability. Preferred foams recover 80 or more percent of initial volume within a month with initial volume being measured within 30 seconds after foam expansion. Volume is measured by a suitable method such as cubic displacement of water.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

The foam structure can be substantially noncross-linked or uncross-linked. The alkenyl aromatic polymer material comprising the foam structure is substantially free of cross-linking. The foam structure contains no more than 5 percent gel per ASTM D-2765–84 Method A. A slight degree of cross-linking, which occurs naturally without the use of cross-linking agents or radiation, is permissible.

The foam structure may also be substantially cross-linked. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The present foam structure may also be made into a continuous plank structure by an extrusion process utilizing a long-land die as described in GB 2,145,961A. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The present foam structure may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. A version is that the polymer beads is impregnated with blowing agent, cooled down, discharged from the vessel, and then expanded by heating or with steam. Blowing agent may be impregnated into the resin pellets while in suspension or, alternately, in non-hydrous state. The expandable beads are then expanded by heating with steam and molded by the conventional molding method for the expandable polystyrene foam beads.

The foam beads may then be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agent prior to charging to the mold. Excellent teachings of the above processes and molding methods are seen in C. P. Park, above publication, pp. 227–233, U.S. Pat. No. 3,886,100, U.S. Pat. No. 3,959,189, U.S. Pat. No. 4,168,353, and U.S. Pat. No. 4,429,059. The foam beads can also be prepared by preparing a mixture of polymer, cross-linking agent, and decomposable mixtures in a suitable mixing device or extruder and form the mixture into pellets, and heat the pellets to cross-link and expand.

In another process for making cross-linked foam beads suitable for molding into articles, the substantially random interpolymer material is melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings to this process are seen in U.S. Pat. No. 3,616,365 and C. P. Park, above publication, pp. 224–228.

The present foam structure may be made in bun stock form by two different processes. One process involves the use of a cross-linking agent and the other uses radiation.

The present foam structure may be made in bun stock form by mixing the substantially random interpolymer material, a cross-linking agent, and a chemical blowing agent to form a slab, heating the mixture in a mold so the cross-linking agent can cross-link the polymer material and the blowing agent can decompose, and expanding by release of pressure in the mold. Optionally, the bun stock formed upon release of pressure may be re-heated to effect further expansion.

Cross-linked polymer sheet may be made by either irradiating polymer sheet with high energy beam or by heating a polymer sheet containing chemical cross-linking agent. The cross-linked polymer sheet is cut into the desired shapes and impregnated with nitrogen in a higher pressure at a temperature above the softening point of the polymer; releasing the pressure effects nucleation of bubbles and some expansion in the sheet. The sheet is re-heated at a lower pressure above the softening point, and the pressure is then released to allow foam expansion.

The foam structure has density of less than 250, more preferably less than 100 and most preferably from about 10 to about 70 kilograms per cubic meter. The foam has an average cell size of from about 0.05 to about 5.0, more preferably from about 0.2 to about 2.0, and most preferably 0.3 to about 1.8 millimeters according to ASTM D3576.

The foam structure may take any physical configuration known in the art, such as extruded sheet, rod, plank, and profiles. The foam structure may also be formed by molding of expandable beads into any of the foregoing configurations or any other configuration.

The foam structure may be closed-celled or open-celled. Preferably, the present foam contains 80 percent or more closed cells according to ASTM D2856-A.

The foams of the present invention will provide protection to electronic components from damage caused by electrostatic discharge (ESD). Specific antistatic or conductive applications of foams made from this invention are as follows cushion packaging of finished electronic goods (comer blocks, braces, saddles, pouches, bags, envelopes, overwraps, interleafing, encapsulation); packaging or protection of explosive materials or devices in environments where spark discharges can readily cause detonation; material handling (trays, tote boxes, box liners, tote box inserts and dividers, shunt, stuffing, boards, parts spacers and parts separators); work station accessories (aprons, table and bench top covers, floor mats, seat cushions); conductive shoe insoles. The foams of this invention may also be of utility in the following applications : gaskets, grommets, seals; Faraday cage shielding; direct lead insertion; shunt bars for edge connections; sound attenuation for printers and typewriters; conductive seat cushioning; static control table and floor mats; carpet underlayment (especially automotive); display case insert; missile container padding; military shell holder; blocking and bracing of various items in transport; preservation and packaging; automotives anti-rattle pads, seals; medical devices, skin contact pads; cushioned pallet; vibration isolation pad. It should be clear, however, that the foams of this invention will not be limited to the above mentioned applications.

In addition to foams, the compositions of the present invention find utility in all applications which require static charge dissipation or electrical conduction or electromagnetic energy absorption, including, but not limited to;

1) shaped articles such as toys, gaskets, films and sheets, photocopier components, as coatings on polymeric substrates, paper, leather, cloth, and inorganic building materials, and as foams for heat, sound, and vibration damping; corrugated boxes, and films and film reels, connectors and clips;
2) transportation applications including but not limited to fuel tanks, bumper facia, instrument panels, hood panels, interior and exterior trim and cladding, pillars, bed liners, seating systems, tires, drive belts, electrical connectors, housings, conduit, energy management systems such as energy management foam systems, gasoline cans, and ignition cables for automobiles;
3) construction materials, flooring systems such as mats, carpets, and carpet backings floor tiles, asphalt, concrete bench tops or counter tops;
4) EMI shielding in for example wire and cable, cellular phones, computer housings, monitors, projection devices, printers, photocopiers, automotive applications and for use in densely packed electronic telecommunication environments;
5) wire and cable for high, medium and low voltage applications, in particular for direct or alternating current applications; for homogenization of conductors in lightning shielding for underground telecommunication cables;
6) durable and electronic goods for example solids handling equipment and conveyor belts, rudders wing tips and engine pylons, landing gear;
7) medical/clothing applications, footwear such as shoes, slippers, boots, and also blankets, gloves, remote handling gloves;
8) Multilayered structures including but not limited to multilayer sheets and films, co-injection molded articles, laminates, fibers, coatings;
9) adhesives;
10) electromotively coated plastics such as electrostatically painted plastics and electroplated plastics;
11) binders for conductive inks, printer paper; and
12) heating equipment.

Properties of the Individual Blend Components and the Final Blend Compositions a) The Ethylene/Vinyl or Vinylidene Internolymers.

The interpolymers of one or more α-olefins and one or more vinyl or vinylidene aromatic monomers and/or one or more hindered aliphatic or cycloaliphatic vinyl or vinylidene monomers employed in the present invention are substantially random polymers. These interpolymers usually contain from about 0.5 to about 65, preferably from about 1 to about 55, more preferably from about 2 to about 50 mole percent of at least one vinyl or vinylidene aromatic monomer and/or hindered aliphatic or cycloaliphatic vinyl or vinylidene monomer and from about 35 to about 99.5, preferably from about 45 to about 99, more preferably from about 50 to about 98 mole percent of at least one aliphatic α-olefin having from 2 to about 20 carbon atoms The number average molecular weight ($M_n$) of these interpolymers is usually greater than about 1,000, preferably from about 5,000 to about 1,000,000, more preferably from about 10,000 to about 500,000.

The interpolymer(s) applicable to the present invention can have a melt index ($I_2$) of from about 0.01 to about 1000, preferably of from about 0.1 to about 100, more preferably of from about 0.5 to about 50 g/10 min.

The polydispersity ratio $M_w/M_n$ of the interpolymer(s) applicable to the present invention is from about 1.5 to about 20, preferably of from about 1.8 to about 10, more preferably of from about 2 to about 5.

While preparing the substantially random interpolymer, an amount of homopolymer may be formed, for example, due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent based on the total weight of the interpolymers of atactic vinyl or vinylidene aromatic homopolymer is present.

b) The Conductive Additive

The optimum amount of conductive additives depends on the particular applications.

For electrically conductive composites there are two regimes of conductivity which are loosely defined as electrostatically dissipative (ESD) which falls within about $10^{-9}$ S/cm to about $10^{-3}$ S/cm, preferably from about $10^{-9}$ to about $10^{-2}$ S/cm, and "conductive"(CON) which is defined here as a conductivity greater than about $10^{-3}$ S/cm.

For ESD the amount of electrically conductive additive will be from about 0.01 to about 50, preferably of from about 0.1 to about 20, more preferably of from about 0.5 to about 12 wt % based on the total weight of the individual blend components.

For CON the amount of electrically conductive additive will be from about 5 to about 70, preferably from about 15 to about 70, more preferably of from about 20 to about 55, and even more more preferably of from about 25 to about 45 wt % based on the total weight of the individual blend components.

c) The Final Blend Compositions.

The blends comprise of from about 1 to about 99.99 wt % of at least one substantially random interpolymer (Component A), preferably of from about 5 to about 97 wt %, more preferably of from about 10 to about 94.0 wt % based on the combined weights of Components A, B, and C.

The blends further comprise 0.01–99 wt % of at least one conductive additive (Component B), preferably of from about 0.5 to about 50 wt %, more preferably of from about 1 to about 25 wt % based on the combined weights of Components A B and C.

The blends further comprise 0–98.99 wt. % of at least one polymer (Component C) which is different to Component A and Component B preferably of from about 2.5 to about 94.5 wt %, more preferably of from about 5 to about 89 wt % based on the combined weights of Components A B and C.

The following examples are illustrative of the invention, but are not to be construed as to limiting the scope thereof in any manner.

EXAMPLES

Test Methods a) Density and Melt Flow Measurements.

The molecular weight of the polymer compositions for use in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

Also useful for indicating the molecular weight of the substantially random interpolymers used in the present invention is the Gottfert melt index (G, cm³/10 min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8% to 81.8% by weight styrene. Atactic polystyrene levels in these samples was typically 10% or less. The influence of the atactic polystyrene was assumed to be minimal because of the low levels. Also, the melt density of atactic polystyrene and the melt densities of the samples with high total styrene are very similar. The method used to determine the melt density employed a Gottfert melt index machine with a melt density parameter set to 0.7632, and the collection of melt strands as a function of time while the $I_2$ weight was in force. The weight and time for each melt strand was recorded and normalized to yield the mass in grams per 10 minutes. The instrument's calculated $I_2$ melt index value was also recorded. The equation used to calculate the actual melt density is $$\delta = \delta_{0.7632} \times I_2 / I_{2\ Gottfert}$$

where $\delta_{0.7632} = 0.7632$ and $I_{2\ Gottfert}$ = displayed melt index.

A linear least squares fit of calculated melt density versus total styrene content leads to an equation with a correlation coefficient of 0.91 for the following equation:

$$\delta = 0.00299 \times S + 0.723$$

where S = weight percentage of styrene in the polymer. The relationship of total styrene to melt density can be used to determine an actual melt index value, using these equations if the styrene content is known.

For a polymer that is 73% total styrene content with a measured melt flow (the "Gottfert number"), the calculation becomes:

$$x = 0.00299 \times 73 + 0.723 = 0.9412$$

where $0.9412/0.7632 = I_2/G\#(\text{measured}) = 1.23$

The density of the substantially random interpolymers used in the present invention was determined in accordance with ASTM D-792.

b) ¹³C—NMR Chemical Shifts.

In order to determine the carbon⁻¹³ NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

c) Styrene Analyses

Atactic Polystyrene concentration was determined by a nuclear magnetic resonance (N.M.R) method, and the total styrene contents was determined by Fourier Transform Infrared spectroscopy (FTIR).

d) Low Temperature Impact

Samples were tested for low temperature impact strength by the instrumented dart impact method (ASTM 3763–93). A Dynatup, Model 8000 drop tower was used (General Research Corporation) with a drop height of 12 inches and drop weight of 138.5 pounds. Specimens were unclamped and the tup diameter was 0.625 inches, with an unsupported sample area of 1.25 inches. Samples were conditioned in a freezer and removed to the test setup, and tested after warming for 44 seconds to achieve −29° C. as determined by blank samples fitted with an internal thermocouple. Data acquisition and calculations were completed using the DYN730 software system. Five samples were tested of each formulation and the results averaged.

e) Conductivity

Injection and compression molded samples obtained in this work often had different conductivity's on the surface compared to the core and were therefore evaluated for both. This is especially true for blends in the ESD conductivity range. "Surface conductivity" is a measurement of the bulk property obtained by traversing the surface of the injection or compression molded part and was obtained from a measurement of the resistance between the top and bottom of a sample which is approximately 3.175 mm thick. After conductive priming, the resistance was measured using graphite paper leads to increase contact surface area and to decrease the contact resistance. The conductivity at the surface was measured by painting a 1 cm² area of surface on both sides of the 3.2 mm thick tensile bar. The resistance from one surface of the bar to the other was measured and the conductivity calculated. This is represented in FIG. 1. Three surface measurements were averaged from three different bars (nine measurements total) and the average of the values reported.

"Core conductivity" is a measurement of the bulk property without traversing the surface of the molded part and was calculated from the resistance in the longitudinal direction across a section of the bar which had been exposed by cold fracturing at 77K. This is represented in FIG. 2.

In either case, the measurement surfaces were painted with a conductive carbon black primer (Type MPP4110, PPG Industries, Oak Creek, Wis.). The carbon black paint is recommended for polyolefins since it has been formulated for good adhesion, while the silver paint can lose contact with the surface.

In either case, the conductivity was calculated from the resistance value, the area of the surface being tested, and the distance between the two measurement surfaces as follows:

σ=conductivity (S/cm)=Resistivity⁻¹ (ohm⁻¹.cm⁻¹) Resistivity= (measured DC resistance in ohms)×(area "A" in cm²) (thickness "B" in cm)

The Individual Blend Components.

a) "PP 1" is a polypropylene homopolymer available from the Dow Chemical Co., having an $I_2$ of 35 g/10 min (measured at 230° C.). "PP 6331" is a polypropylene homopolymer available from Montell having an $I_2$ of 12 grams /10 minutes (measured at 230° C.). "PP-44"

is C705–44NA polypropylene having a melt flow of about 44 commercially produced by The Dow Chemical Company.

b) "IP60" is an HDPE Dowlex IP60 commercially produced by The Dow Chemical Company, having an $I_2$ of 60 g/10 minute c) ENGAGE™ 8180 is an ethylene/octene copolymer having a density of 0.8630 g/cm$^3$ and a melt index ($I_2$) of 0.50 g/10 min and is commercially available from DuPont Dow Elastomers.

d) ENGAGE™ 8200 is an ethylene/octene copolymer having a density of 0.8700 g/cm$^3$ and a melt index ($I_2$) of 5.00 g/10 min and is commercially available from DuPont Dow Elastomers.

e) STYRON™ 665 is a polystyrene having an $I_2$ of 1.5 g/10 minutes (measured at 200° C.) and available from The Dow Chemical Company.

f) STYRON™ 680 is a polystyrene having an $I_2$ of 10 g/10 minutes (measured at 200° C.) and available from The Dow Chemical Company.

g) "XE-2" is a conductive carbon black available as Degussa XE-2 from the Degussa Corporation and having, a tapped density of 140 g/l, a pH value of 8.5, and a DBP adsorption value of 380 ml/100 grams.

h) ESI#'s 1–??? were ethylene/styrene interpolymers and ESP #'s 1–3 were ethylene/propylene/styrene interpolymers prepared using the following catalysts, cocatalyst and polymerization procedure. The process conditions for these samples are summarized in Table 1 and the polymer properties are summarized in Table 2.

Catalyst (dimethyl[N-(1,1-dimethylethyl)-1,1-dimethyl-1-[(1,2,3,4,5-η)-1,5,6,7-tetrahydro-3-phenyl-s-indacen-1-yl] silanaminato(2-)-N]- titanium) Preparation. Preparation of 3,5,6,7-Tetrahydro-s-Hydrindacen-1(2H)-one.

Indan (94.00 g, 0.7954 moles) and 3-chloropropionyl chloride (100.99 g, 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield). $^1$H NMR (CDCl$_3$): d2.04–2.19 (m, 2 H), 2.65 (t, $^3$HH=5.7 Hz, 2 H), 2.84–3.0 (m, 4 H), 3.03 (t, $^3$HH=5.5 Hz, 2 H), 7.26 (s, 1 H), 7.53 (s, 1 H).$^{13}$C NMR (CDCl$_3$): d25.71, 26.01, 32.19, 33.24, 36.93, 118.90, 122.16, 135.88, 144.06, 152.89, 154.36, 206.50. GC-MS: Calculated for $C_{12}H_{12}O$ 172.09, found 172.05.

Preparation of 1,2,3,5-Tetrahydro-7-phenyl-s-indacen 3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$ (2×100 mL) and then dried over $MgSO_4$. Filtration followed by the removal of the volatiles resulted in the isolation of the desired product as a dark oil (14.68 g, 90.3% yield). $^1$H NMR (CDCl$_3$): d2.0–2.2 (m, 2 H), 2.8–3.1 (m, 4 H), 6.54 (s, 1H), 7.2–7.6 (m, 7 H). GC-MS: Calculated for $C_{18}H_{16}$ 232.13, found 232.05.

Preparation of 1,2,3,5-Tetrahydro-7-phenyl-s-indacene, dilithium salt 1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

Preparation of Chlorodimethyl(1,5,6,7-tetrahydro-3-phenyl-s-indacen-1-yl)silane 1,2,3,5-Tetrahydro-7-phenyl-s-indacene, dilithium salt (12.2075 g, 0.05102 moles) in THF (50 mL) was added dropwise to a solution of $Me_2SiCl_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield). $^1$H NMR (CDCl$_3$): d0.33 (s, 3 H), 0.38 (s, 3 H), 2.20 (p, $^3$HH=7.5 Hz, 2 H), 2.9–3.1 (m, 4 H), 3.84 (s, 1 H), 6.69 (d, $^3$HH=2.8 Hz, 1 H), 7.3–7.6 (m, 7 H), 7.68 (d, $^3$HH=7.4 Hz, 2 H). $^{13}$C NMR (CDCl$_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for $C_{20}H_{21}ClSi$ 324.11, found 324.05.

Preparation of N-(1,1-Dimethylethyl)-1,1-dimethyl-1-(1,5,6,7-tetrahydro-3-phenyl-s-indacen-1-yl) silanamine Chlorodimethyl(1,5,6,7-tetrahydro-3-phenyl-s-indacen-1-yl)silane (10.8277 g, 0.03322 moles) was stirred in hexane (150 mL) as NEt$_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield). $^1$H NMR (CDCl$_3$): d0.02 (s, 3 H), 0.04 (s, 3 H), 1.27 (s, 9 H), 2.16 (p, $^3$HH=7.2 Hz, 2 H), 2.9–3.0 (m, 4 H), 3.68 (s, 1 H), 6.69 (s, 1 H), 7.3–7.5 (m, 4 H), 7.63 (d, $^3$HH=7.4 Hz, 2 H). $^{13}$C NMR (CDCl$_3$): d−0.32, −0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

Preparation of N-(1,1-Dimethylethyl)-1,1-dimethyl-1-(1,5,6,7-tetrahydro-3-phenyl-s-indacen-1-yl) silanamine, dilithium salt N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of $TiCl_3(THF)_3$ (4.5005 g, 0.01214 moles) in THF (100 mL). This mixture was allowed to stir for 2 hours. $PbCl_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0C. The desired product was then isolated via filtration as a red-brown crystalline solid (2.5280 g, 43.5% yield). $^1H$ NMR ($CDCl_3$): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t, $^3$$^jHH$=7.8 Hz, 2 H), 7.57 (s, 1 H), 7.70 (d, $^3$$^jHH$=7.1 Hz, 2 H), 7.78 (s, 1 H). $^1H$ NMR ($C_6D_6$): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3$$^jHH$=7.1 Hz, 2 H), 7.61 (s, 1 H), 7.69 (s, 1 H), 7.77–7.8 (m, 2 H). $^{13}C$ NMR ($CDCl_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93. $^{13}C$ NMR($C_6D_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

Preparation of Dimethyl[N-(11-dimethylethyl)-1,1-dimethyl-1-[(1,2,3,4,5-η)-1,5,6,7-tetrahydro-3--phenyl-s-indacen-1-yl]silanaminato(2-)-N]titanium Dichloro[N-(1,1-dimethylethyl)-1,1-dimethyl-1-[(1,2,3,4,5-η)-1,5,6,7-tetrahydro-3-phenyl-s-indacen-1-yl] silanaminato(2-)-N]titanium (0.4970 g, 0.001039 moles) was stirred in diethylether (50 mL) as MeMgBr (0.0021 moles, 0.70 mL of 3.0M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield). $^1H$ NMR ($C_6D_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3$$^jHH$=7.4 Hz, 2 H), 7.48 (s, 1 H), 7.72 (d, $^3$$^jHH$=7.4 Hz, 2 H), 7.92 (s, 1 H). $^{13}C$ NMR ($C_6D_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Preparation of Catalyst B;(1H-cyclopenta[1] phenanthrene-2-yl)dimethyl(t-butlamido)-silanetitanium 1,4-diphenylbutadiene)

1) Preparation of lithium 1H-cyclopenta[1]phenanthrene-2-yl

To a 250 ml round bottom flask containing 1.42 g (0.00657 mole) of 1H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1 H-cyclopenta[1]phenanthrene-2-yl) dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1 H-cyclopenta[1] phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3) Preparation of (1H-cyclopenta[1]phenanthrene-2-yl) dimethyl(t-butylamino)silane To a 500 ml round bottom flask containing 1.98 g (0.0064 mole) of (1H-cyclopenta[1]phenanthrene-2-yl) dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4) Preparation of dilithio (1 H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5) Preparation of (1H-cyclopenta[1]phenanthrene-2-yl) dimethyl(t-butylamido)silanetitanium dichloride To a 250 ml round bottom flask containing 1.17 g (0.0030 mole) of $TiCl_3$.3THF and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6) Preparation of (1 H-cyclopenta[1]phenanthrene-2-yl) dimethyl(t-butylamido)silanetitanium 1,4-diphenylbutadiene To a slurry of (1 H-cyclopenta[1]phenanthrene-2-yl) dimethyl(t-butylamido)silanetitanium dichloride (3.48 g, 0.0075 mole) and 1.551 gm (0.0075 mole) of 1,4-diphenyllbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours.

The mixture was cooled to about −25° C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

Cocatalyst (bis(hydroyenated-tallowalkyl) methylamine) (B-FABA) Preparation

Methylcyclohexane (1200 mL) was placed in a 2L cylindrical flask. While stirring, bis(hydrogenated-tallowalkyl) methylamine (ARMEEN® M2HT, 104 g, ground to a granular form) was added to the flask and stirred until completely dissolved. Aqueous HCl (1M, 200 mL) was added to the flask, and the mixture was stirred for 30 minutes. A white precipitate formed immediately. At the end of this time, $LiB(C_6F_5)_4 \cdot Et_2O \cdot 3$ LiCl (Mw=887.3; 177.4 g) was added to the flask. The solution began to turn milky white. The flask was equipped with a 6" Vigreux column topped with a distillation apparatus and the mixture was heated (140° C. external wall temperature). A mixture of ether and methylcyclohexane was distilled from the flask. The two-phase solution was now only slightly hazy. The mixture was allowed to cool to room temperature, and the contents were placed in a 4 L separatory funnel. The aqueous layer was removed and discarded, and the organic layer was washed twice with $H_2O$ and the aqueous layers again discarded. The $H_2O$ saturated methylcyclohexane solutions were measured to contain 0.48 wt percent diethyl ether ($Et_2O$).

The solution (600 mL) was transferred into a 1 L flask, sparged thoroughly with nitrogen, and transferred into the drybox. The solution was passed through a column (1" diameter, 6" height) containing 13X molecular sieves. This reduced the level of $Et_2O$ from 0.48 wt percent to 0.28 wt percent. The material was then stirred over fresh 13X sieves (20 g) for four hours. The $Et_2O$ level was then measured to be 0.19 wt percent. The mixture was then stirred overnight, resulting in a further reduction in $Et_2O$ level to approximately 40 ppm. The mixture was filtered using a funnel equipped with a glass frit having a pore size of 10–15 μm to give a clear solution (the molecular sieves were rinsed with additional dry methylcyclohexane). The concentration was measured by gravimetric analysis yielding a value of 16.7 wt percent.

Polymerization

The interpolymers were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Ethylbenzene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene streams was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer seperated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

The various catalysts, co-catalysts and process conditions used to prepare the various individual ethylene styrene interpolymers for use in the blend compositions of the present invention are summarized in Table 1.

TABLE 1

Process Conditions For Preparation Of Individual Blend Components

| Sample # | Reactor Temp ° C. | Solvent Flow lb/hr (kg/hr) | Ethylene Flow lb/hr (kg/hr) | Hydrogen Flow lb/hr (kg/hr) | Styrene Flow lb/hr (kg/hr) | Propylene Flow lb/hr (kg/hr) | C2 Conversion % | Catalyst | Co-Catalyst | B/Ti Ratio | MMAO[e]/ Ti Ratio |
|---|---|---|---|---|---|---|---|---|---|---|---|
| ESI #1 | 73.4 | 13.5 (6.1) | 1.2 (0.5) | 9 (4.1) | 12.0 (5.4) | — | 87.3 | a | B-FABA | 1.3 | 10 |
| ESI #2 | 101.4 | 19.2 (8.7) | 2.0 (0.9) | 4 (1.8) | 7.0 (3.2) | — | 86.5 | b | B-FABA | 1.3 | 10 |
| ESI #3 | 99.2 | 45.0 (20.4) | 4.3 (1.9) | 20 (9.0) | 5.0 (2.3) | — | 96.6 | a | FAB[c] | 3.5 | 3.5 |
| ESI #4 | 84.3 | 28.3 (12.8) | 2.3 (1.0) | 15.9 (7.2) | 10.5 (4.8) | — | 92.2 | a | B-FABA | 1.2 | 10 |
| ESI #5 | 92.2 | 37.0 (16.8) | 2.8 (1.3) | 25.3 (11.5) | 8.0 (3.6) | — | 96.5 | a | FAB[c] | 3.5 | 3.5 |
| ESI #6 | 82.2 | 37.0 (16.8) | 1.9 (0.9) | 4 (1.8) | 70 (31.7) | — | 96.6 | a | FAB[c] | 3.5 | 3.5 |
| ESI #7 | 101.4 | 36.0 (16.3) | 3.9 (1.8) | 35 (15.8) | 2.9 (1.3) | — | 95.9 | a | FAB[c] | 3.5 | 3.0 |
| ESI #8 | 80.7 | 37.0 (16.8) | 1.9 (0.9) | 35 (15.8) | 6.5 (2.9) | — | 95.2 | a | FAB[c] | 3.5 | 3.5 |
| ESI #9 | 79.3 | 41.0 (18.6) | 2.2 (1.0) | 26 (11.8) | 210 (95.1) | — | 96.9 | a | FAB[c] | 3.5 | 6 |
| ESI #10 | 92.1 | 32.0 (14.5) | 2.8 (1.3) | 5.0 (2.3) | 5.0 (2.3) | — | 96.9 | a | FAB[c] | 3.5 | 3.5 |
| ESI #11 | 88.8 | 37.0 (16.8) | 2.8 (1.3) | 30.0 (13.6) | 8.5 (3.8) | — | 96.2 | a | FAB[c] | 3.5 | 3.5 |
| ESI #12 | 82.3 | 37.0 (16.8) | 1.9 (0.9) | 3.8 (1.8) | 7.0 (3.2) | — | 96.6 | a | FAB[c] | 3.5 | 3.5 |
| ESI #13 | 99.0 | 45.0 (20.4) | 4.3 (1.9) | 21.0 (9.5) | 5.0 (2.3) | — | 96.6 | a | FAB[c] | 3.5 | 3.5 |
| ESI #14 | 91.5 | 38.6 (17.5) | 3.1 (1.4) | 14.5 (6.6) | 6.5 (2.9) | — | 96.8 | a | FAB[c] | 3.0 | 7.0 |
| ESI #15 | 79.8 | 37.0 (16.8) | 1.9 (0.9) | 25.0 (11.3) | 7.0 (3.2) | — | 96.3 | a | FAB[c] | 3.5 | 3.5 |
| ESI #16 | 103.1 | 36.0 (16.3) | 3.9 (1.8) | 22.0 (10.0) | 2.9 (1.3) | — | 95.8 | a | FAB[c] | 3.5 | 3.0 |
| ESI #17 | 76.9 | 30.0 (13.6) | 1.3 (0.6) | 5.0 (2.3) | 10.0 (4.5) | — | 99.0 | a | FAB[c] | 2.8 | 4.0 |
| ESI #18 | 100.7 | 35.0 (15.8) | 4.0 (1.8) | 10.0 (4.5) | 3.7 (1.7) | — | 91.1 | f | FAB[c] | 3.0 | 5.0 |
| ESI #19 | 85.0 | 35.0 (15.8) | 2.8 (1.3) | 10.0 (4.5) | 6.3 (2.8) | — | 91.8 | f | FAB[c] | 3.0 | 5.0 |
| ESI #20 | 70.0 | 30.0 (13.6) | 1.3 (0.6) | 1.0 (0.4) | 11.5 (5.2) | — | 95.7 | a | FAB[c] | 3.0 | 4.0 |
| ESI #21 | 102.0 | 36 (16.3) | 3.9 (1.8) | 25.5 (11.5) | 2.8 (1.3) | — | 96.0 | a | FAB[c] | 3.0 | 6.0 |
| EPS #1 | 68.8 | 14.0 (6.3) | 1.2 (0.5) | 18.0 (8.1) | 5.0 (2.3) | 1.2 (0.5) | 83.5 | b | FAB[c] | 4.6 | 1.7 |
| EPS #2 | 63.3 | 11.0 (5.0) | 1.2 (0.5) | 19.0 (8.6) | 8.0 (3.6) | 0.8 (0.4) | 73.9 | b | FAB[c] | 4.0 | 8.0 |
| EPS #3 | 60.9 | 7.0 (3.2) | 1.2 (0.5) | 16.0 (7.2) | 12.0 (5.4) | 0.4 (0.2) | 75.9 | b | FAB[c] | 3.0 | 8.0 |

[a]catalyst is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium.
[b]catalyst is (t-butylamido)dimethyl(tetramethylcyclopentadienyl)silane-titanium (II) 1,3-pentadiene prepared as described in U.S. Pat. No. 5,556,928, Example 17
[c]BFABA is bis-hydrogenated tallowalkyl methylammonium tetrakis (pentafluorophenyl)borate.
[d]FAB is tris(pentafluorophenyl-borane, (CAS #001109-15-5).
[e]a modified methylaluminoxane commercially available from Akzo Nobel as MMAO-3A (CAS #146905-79-5)
[f]catalyst is; (1H-cyclopenta[1]phenanthrene-2-yl)dimethyl(t-butylamido)-silanetitanium 1,4-diphenylbutadiene)

TABLE 2

Properties of Individual Blend Components

| Interpolymer Component A | Gottfert Viscosity (cm³/10 m) | wt % aPS | mol % (wt %) styrene | wt % propylene |
|---|---|---|---|---|
| ESI #1 | 1.16 | <10 | 36.6 (68.2) | 0 |
| ESI #2 | 1.12 | 6.5 | 9.7 (28.5) | 0 |
| ESI #3 | 1.51 | 0.25 | 10.5 (30.3) | 0 |
| ESI #4 | 1.09 | 2.00 | 23.9 (53.9) | 0 |
| ESI #5 | 1.11 | 0.80 | 19.0 (46.6) | 0 |
| ESI #6 | 1.10 | 0.80 | 27.8 (58.8) | 0 |
| ESI #7 | 10.80 | 0.15 | 6.8 (21.3) | 0 |
| ESI #8 | 19.05 | 0.90 | 24.2 (54.2) | 0 |
| ESI #9 | 10.93 | 2.80 | 43.4 (74) | 0 |
| ESI #10 | 1.65 | 8.12 | 16.9 (43.1) | 0 |
| ESI #11 | 2.73 | 8.30 | 23.3 (53) | 0 |
| ESI #12 | 1.00 | 0.60 | 27.9 (59) | 0 |
| ESI #13 | 1.60 | 8.55 | 11.1 (31.7) | 0 |
| ESI #14 | 1.4 | 0.6 | 18.1 (45.1) | 0 |
| ESI #15 | 11.2 | .75 | 31.4 (63) | 0 |
| ESI #16 | 1.2 | .1 | 7.0 (21.9) | 0 |
| ESI #17 | 9 | 4.2 | 52.0 (80.1) | 0 |
| ESI #18 | 1.1 | 1.0 | 12.0 (33.7) | 0 |
| ESI #19 | 2.9 | 2.1 | 24.6 (54.8) | 0 |
| ESI #20 | 1.2 | 6.4 | 47.8 (77.3) | 0 |
| ESI #21 | 8.0 | 0.1 | 7.0 (21.9) | 0 |
| EPS #1 | 1.90 | 2.3 | (27.0) | 33.0 |
| EPS #2 | 1.87 | 9.3 | (37.0) | 23.0 |
| EPS #3 | 1.04 | 26.6 | (47.0) | 13.0 |

Processing

Mixing of the blends was done on a Haake RC-90 torque rheometer equipped with a Rheomix 3000 (Haake) mixing bowl with standard roller blades. The sample mixing capacity was approximately 200 grams. To obtain enough material for injection molding, duplicate mixing runs were made for each formulation. Mixing data for each run was stored as a data file. Compression molding required less material and required only one Haake blending batch of material.

The mixed carbon-filled or other conductive additive-filled polymer samples were ground in a Wiley mill (Model 4, Thomas Scientific) after being cooled in liquid nitrogen. The ground samples were vacuum dried overnight just prior to molding. Injection molding was done in a Boy 30M molding machine with a barrel temperature of 200° C., nozzle temperature of 210° C., and mold temperature of 45° C. Molding injection pressure was typically 500 psi, and hold pressure was 550 psi. Overall cycle time was 40 seconds. Molded samples consisted of one tensile bar and one disk for impact testing per shot. Typically, the first 6 shots were discarded and the next 10 or more collected as sample quantity allowed. Compression molding was done on a Carver hydraulic press with the platens heated to 195° C.+/−5° C. The platen pressure was typically 5000 psig and was held for approximately 4 minutes. Once removed from the press, the molding set-up was placed in dry ice to quickly cool the sample for easy removal from the mold. Molded samples were 6.25 cm×1.25 cm bars.

Many examples below are formulations of rubber modified polypropylenes which have been melt processed, injection molded, and then tested for conductivity, low temperature impact (LTI) and melt viscosity (MFR). In general it is best to have high values for all of these. A commercial threshold value for LTI in a TPO fascia or instrument panel would be about 30 ft-lb.

Table 3 shows that the presence of both EPS and ESI enhances the conductivity of the core of a blend sample and also brings the conductivity to the surface of a composite which would otherwise be surface insulating. The property of surface conductivity is beneficial because it allows facile grounding of the part.

TABLE 3

ESI and EPS polymers as an additive in PP

| Ex # | ESI (Component A) Type | (wt %) | Other Polymer Component C Type | (wt %) | Degussa XE-2 Component B wt % | Core Cond.[a] (S/cm) | Surf. Cond.[a] (S/cm) | LTI (ft-lb) | Blend MFR |
|---|---|---|---|---|---|---|---|---|---|
| Comp. Ex 1 | none, | 0 | IP60<br>PP 1<br>EG8180 | 7%<br>52%<br>35% | 6 | 3E-5 | OL | 43.0 | 3.8 |
| Ex 1 | EPS #1 | 35 | IP60<br>PP 1 | 7%<br>52% | 6 | 2E-4 | 2E-5 | 0.3 | 6.2 |
| Ex. 2 | EPS #2 | 35 | IP60<br>PP 1 | 7%<br>52% | 6 | 1E-4 | 2E-5 | 0.5 | 6.0 |
| Ex. 3 | EPS #3 | 35 | IP60<br>PP H702 | 7%<br>52% | 6 | 7E-5 | 9E-5 | 0.1 | 4.7 |
| Ex. 4 | ESI #1 | 35 | IP60<br>PP 1 | 7%<br>52% | 6 | 2E-4 | 7E-5 | 0.1 | 5.4 |
| Ex 5 | ESI #2 | 35 | IP60<br>PP 1 | 7%<br>52% | 6 | 2E-4 | 4E-5 | 0.2 | 4.8 |

[a]Conductivity is reported in exponential notation where for example 3E-5 is equivalent to $3.0 \times 10^{-5}$. A value of OL designates a conductance of $<1 \times 10^{-8}$ S/cm.

Table 4 shows that in rubber modified polypropylene composites which are formulated to include EG8180 (impact rubber modifier) the LTI can be maintained while adding surface conductivity. At equal conductive carbon concentrations the ESI-containing rubber modified polypropylene is somewhat more conductive at the core, and significantly more conductive at the surface. This unexpected result occurs with as little as 10% wt. of ESI in the formulation.

TABLE 4

Use of PS, ESI and EPS in TPO

| Ex # | ESI (Component A) Type | (wt %) | Other Polymer (Component C) Type | (wt %) | Degussa XE-2 (Component B) wt % | Core Cond.[a] (S/cm) | Surf. Cond.[a] (S/cm) | LTI (ft-lb) | Blend MFR |
|---|---|---|---|---|---|---|---|---|---|
| Comp. Ex 2 | none | 0 | IP60<br>EG 8180<br>PP 1 | 7<br>35<br>53 | 5 | 3E-6 | OL | 40.0 | 4.8 |
| Comp Ex 3 | none | 0 | IP60<br>EG 8180<br>PP 1 | 7<br>35<br>52 | 6 | 3E-5 | OL | 43.0 | 4.5 |
| Ex 6 | ESI #3 | 10 | IP60<br>EG 8180<br>PP 1 | 7<br>26<br>53 | 4 | 6E-7 | OL | 44.8 | 6.1 |
| Ex 7 | ESI #3 | 10 | IP60<br>EG 8180<br>PP 1 | 7<br>25<br>53 | 5 | 1E-5 | OL | 44.2 | 4.6 |
| Ex 8 | ESI #2 | 13 | EG 8180<br>PP 1 | 29<br>52 | 6 | 6E-6 | OL | 45.3 | 2.8 |
| Ex 9 | ESI #1 | 10 | IP60<br>EG 8180<br>PP 1 | 7<br>25<br>52 | 6 | 8E-5 | 2E-5 | 31.1 | 3.6 |
| Ex 10 | ESI #2 | 10 | IP60<br>EG 8180<br>PP 1 | 7<br>25<br>52 | 6 | 9E-5 | 2E-8 | 46.5 | 3.7 |
| Ex 11 | EPS #1 | 10 | IP60<br>EG 8180<br>PP 1 | 7<br>25<br>52 | 6 | 9E-6 | 4E-6 | 43.2 | 4.0 |
| Ex 12 | EPS #3 | 10 | IP60<br>EG 8180<br>PP 1 | 7<br>25<br>52 | 6 | 3E-5 | 2E-6 | 24.4 | 3.5 |
| Ex 13 | EPS #1 | 13 | EG 8180<br>PP 1 | 29<br>52 | 6 | 8E-6 | 2E-7 | 46.4 | 3 |
| Ex 14 | EPS #2 | 13 | EG 8180<br>PP 1 | 29<br>52 | 6 | 1E-5 | 5E-8 | 45.8 | 3.1 |

TABLE 4-continued

Use of PS, ESI and EPS in TPO

| | ESI (Component A) | | Other Polymer (Component C) | | Degussa XE-2 (Component B) | Core Cond[a] (S/cm) | Surf. Cond.[a] (S/cm) | LTI | Blend |
|---|---|---|---|---|---|---|---|---|---|
| Ex # | Type | (wt %) | Type | (wt %) | wt % | a | a | (ft-lb) | MFR |
| Ex 15 | EPS #3 | 13 | EG 8180<br>PP 1 | 29<br>52 | 6 | 2E−5 | OL | 45.6 | 2.9 |

[a] Conductivity is reported in exponential notation where for example 3E−5 is equivalent to $3.0 \times 10^{-5}$. A value of OL designates a conductance of $<1 \times 10^{-8}$ S/cm.

Table 5 shows that there is an improvement in conductivity with ESI for polypropylene based formulations having EG8200 as the impact modifier.

TABLE 5

Use of ESI in Conductive Thermoplastic Polyolefins

| | ESI Component A | | Other Polymer Component C | | Degussa XE-2 Component B | Core Cond (S/cm) | Surf. Cond (S/cm) | LTI | Blend |
|---|---|---|---|---|---|---|---|---|---|
| Ex # | Type | (Wt %) | Type | (Wt %) | Wt % | a | a | (ft-lb) | MFR |
| Ex 16 | ESI #3 | 10 | IP60<br>EG8200<br>PP1 | 7<br>26<br>53 | 4 | 1E−6 | OL | 43.2 | 10.6 |
| Ex 17 | ESI #3 | 10 | IP60<br>EG8200<br>PP1 | 7<br>25<br>53 | 5 | 2E−5 | OL | 19.8 | 8.3 |
| Ex 18 | ESI #3 | 10 | IP60<br>EG8200<br>PP1 | 7<br>25<br>52 | 6 | 7E−5 | 6E−8 | 11.7 | 7.6 |
| Comp Ex 4 | none | 0 | IP60<br>EG8200<br>PP1 | 7<br>35<br>54 | 4 | 2E−6 | OL | 42.8 | 11.8 |
| Comp Ex 5 | none | 0 | IP60<br>EG8200<br>PP1 | 7<br>35<br>53 | 5 | 2E−5 | OL | 42.1 | 9.6 |

[a] Conductivity is reported in exponential notation where for example 3E−5 is equivalent to $3.0 \times 10^{-5}$. A value of OL designates a conductance of $<1 \times 10^{-8}$ S/cm.

Table 6 shows that ESI added to several different host polymers improves the conductivity at constant conductive carbon loading, in comparison to the Comparative Experiment # made without ESI.

TABLE 6

ESI As An Additive To Semiconducting Carbon Loaded Polymers

| | Other Polymer | ESI Component A | | Degussa XE-2 Component B | conductivity @ core (s/cm) |
|---|---|---|---|---|---|
| Ex # | Component C | Type | wt % Styrene | wt % | a |
| Comp Ex 6 | PP1 | — | 0 | 2 | 1.1E−6 |
| Ex 19 | | ESI #13 | 25% | 2 | 1.1E−4 |
| Ex 20 | | ESI #12 | 25% | 2 | 1.8E−8 |
| Comp Ex 7 | EG 8180 | — | 0 | 2 | OL |
| Ex 21 | | ESI #13 | 25% | 2 | OL |
| Ex 22 | | ESI #12 | 25% | 2 | OL |
| Comp Ex 8 | Styron 665 | — | 0 | 2 | OL |
| Ex 23 | | ESI #13 | 25% | 2 | 7.2E−8 |
| Ex 24 | | ESI #12 | 25% | 2 | OL |

TABLE 6-continued

ESI As An Additive To Semiconducting Carbon Loaded Polymers

| Ex # | Other Polymer Component C | ESI Component A Type | ESI Component A wt % Styrene | Degussa XE-2 Component B wt % | conductivity @ core (s/cm) [a] |
|---|---|---|---|---|---|
| Comp Ex 9 | Styron 680 | — | 0 | 2 | 2.9E−8 |
| Ex 25 | | ESI #13 | 25% | 2 | 6.8E−8 |
| Ex 26 | | ESI #12 | 25% | 2 | 3.7E−8 |

[a]Conductivity is reported in exponential notation where for example 3E−5 is equivalent to $3.0 \times 10^{-5}$. A value of OL designates a conductance of $<1 \times 10^{-8}$ S/cm.

The balance of physical properties and conductivity is an important feature of the present invention. Polypropylenes (PP), polystyrenes (PS), ethylene styrene interpolymers (ESI), and ethylene propylene styrene interpolymers (EPS) all have similar percolation behavior (the development of conductivity as a function of conductive additive loading level). That is, when loaded with the same amount of conductive additive they exhibit similar conductivities. However, at similar loading levels of conductive additive, PP and PS are more brittle than ESI and EPS as measured by, for example, flex modulus. The balance of physical properties is different when comparing ESI and EPS to, for example, ethylene/alpha olefin copolymers (AOC). The flexibility of conductive carbon loaded AOC, ESI and EPS are similar at similar conductive carbon loading levels. However, the amount of conductive carbon required to achieve the same conductivity differs, AOC requires more conductive carbon than does ESI or EPS.

Table 7 below shows the conductivity of various polymers at several loadings of conductive Degussa XE-2 carbon. From this it can be seen that ES and EPS interpolymers have conductivity which is similar to PS and significantly higher than polyolefins, especially EO rubbers, e.g. EG8180, when modified to be semiconducting.

The good percolation behavior exhibited when the primarily amorphous interpolymers are a component of the blends of the present invention is unexpected. Semiconductivity is enhanced by crystallinity in a given polymer. Thus PP, a polymer having significant crystallinity, exhibits semiconductivity when loaded with an appropriate amount of conductive additive. In comparison Engage™ rubbers which are amorphous exhibit poor conductivity when loaded with an equivalent amount of conductive additive.

TABLE 7

Conductivity of Individual Blend Components vs Degussa XE-2 Loading

| Example # | Polymer | Degussa XE-2 wt % | conductivity (S/cm)[a] |
|---|---|---|---|
| Comp Ex 10 | Engage 8180 | 10 | 4E−7 |
| | | 20 | 9.1E−2 |
| | | 30 | 0.55 |
| Comp Ex 11 | Profax ™ 6331 | 10 | 2E−2 |
| Comp Ex 12 | Styron ™ 665 | 10 | 2E−3 |
| Comp Ex 13 | Styron ™ 680 | 10 | 2E−4 |
| Ex 27 | EPS #1 | 10 | 3E−3 |
| Ex 28 | EPS #2 | 10 | 2E−2 |
| Ex 29 | EPS #3 | 10 | 2E−2 |
| Ex 30 | ESI #2 | 10 | 3E−3 |
| Ex 31 | ESI #4 | 10 | 6E−3 |
| Ex 32 | ESI #1 | 10 | 2E−2 |
| Ex 33 | ESI #13 | 30 | 0.47 |
| Ex 34 | ESI #5 | 30 | 0.45 |
| Ex 35 | ESI #11 | 30 | 0.52 |
| Ex 36 | ESI #12 | 30 | 0.64 |
| Ex 37 | ESI #3 | 10 | 1E−8 |
| Ex 38 | ESI #5 | 10 | 1E−5 |
| Ex 39 | ESI #6 | 10 | 1E−3 |

[a]Conductivity is reported in exponential notation where for example 3E−5 is equivalent to $3.0 \times 10^{-5}$. A value of OL designates a conductance of $<1 \times 10^{-8}$ S/cm.

TABLE 8

| Ex # | ESI #16 w % (mol %) styrene | ESI #16 Melt Index, G # | ESI #16 wt % in blend | Second ESI wt % (mol %) styrene (ESI #) | Second ESI Melt Index, G # | Second ESI wt % in blend | Conductivity* 6 wt % Degussa XE2 (S/cm) |
|---|---|---|---|---|---|---|---|
| 40 | 22.0 (7.1) | 1.2 | 94 | | | 0 | 4.5E−6 |
| 41 | | | | 80.0 (51.8) (ESI #20) | 10.0 | 94 | 7.8E−3 |
| 42 | 22.0 (7.1) | 1.2 | 75 | 80.0 (51.8) (ESI #20) | 10.0 | 19 | 2.5E−4 (1.5E−3) |

TABLE 8-continued

| | ESI #16 | | | Second ESI | | | Conductivity* 6 wt % Degussa |
| --- | --- | --- | --- | --- | --- | --- | --- |
| Ex # | w % (mol %) styrene | Melt Index, G # | wt % in blend | wt % (mol %) styrene (ESI #) | Melt Index, G # | wt % in blend | XE2 (S/cm) |
| 43 | | | | 63.0 (31.4) (ESI #15) | 11.2 | 94 | 8.8E−5 |
| 44 | 22.0 (7.1) | 1.2 | 75 | 63.0 (31.4) (ESI #15) | 11.2 | 19 | 1.4E−3 (2.0E−5) |
| 45 | | | | 55.0 (24.8) (ESI #19) | 2.9 | 94 | 1.3E−6 |
| 46 | 22.0 (7.1) | 1.2 | 75 | 55.0 (24.8) (ESI #19) | 2.9 | 19 | 1.8E−4 (3.6E−6) |
| 47 | | | | 45.0 (18.0) (ESI #14) | 1.4 | 94 | 2.3E−8 |
| 48 | 22.0 (7.1) | 1.2 | 75 | 45.0 (18.0) (ESI #14) | 1.4 | 19 | 3.6E−4 (3.4E−6) |
| 49 | | | | 34.0 (12.2) (ESI #18) | 1.1 | 94 | 3.2E−7 |
| 50 | 22.0 (7.1) | 1.2 | 75 | 34.0 (12.2) (ESI #18) | 1.1 | 19 | 9.2E−5 (3.4E−6) |

*Compression molded samples, additive value in parentheses

Compression molding was done on a Carver Model 2697 Press at 10,000 psi for es at 385° F. These results show that, generally, the use of two ethylene/styrene interpolymers having different styrene contents provides higher conductivity than the case for r which one ethylene/styrene interpolymer is used, at equivalent conductive filler The exception is for the comparison to the case of a single ethylene/styrene interpolymer which has a styrene content of greater than 75 wt %.

Examples 51–53

These Examples show as do the examples of Table 8 that, generally, the use of two ethylene/styrene interpolymers having different styrene contents provides higher conductivity than the case for which one ethylene/styrene interpolymer is used, at equivalent conductive filler levels.

Examples 54–65

The Examples in Table 10 illustrate the conductive modification of ethylene/styrene interpolymers with a different conductive filler, a nearly white colored inorganic semiconductor FT-1000 produced by The Nagase Corporation. For these, a larger amount of conductive filler is required in order to achieve semiconductivity in comparison to the use of conductive carbons. The results in Table 10 show, similar to those of Table 9, that the use of two Ethylene/styrene interpolymers having different styrene contents provides higher conductivity than the case for which one ethylene/styrene interpolymer is used, at equivalent conductive filler levels. The results also illustrate that several different types of inorganic semiconducting oxides can be used for this invention. These conductive composites are significant

TABLE 9

| | First ESI ESI #14 | | | Second ESI | | | Conductivity* at 6 wt % Degussa |
| --- | --- | --- | --- | --- | --- | --- | --- |
| Ex # | wt % (mol %) styrene | Melt Index, G # | wt % in blend | wt % (mol %) styrene (ESI #) | Melt Index, G # | wt % in blend | XE2 (S/cm) |
| 51 | 45.0 (18.0) | 1.4 | 94 | | | 0 | 2.3E−8 |
| 52 | | | | 80.0 (51.8) (ESI #17) | 10.0 | 94 | 7.8E−3 |
| 53 | 45.0 (18.0) | 1.4 | 75 | 80.0 (51.8) (ESI #17) | 10.0 | 19 | 3.2E−5 (1.5E−3) |

*additive value in parentheses

These results show that when the minor component of the blend has a styrene content of less than or equal to about 75 wt % styrene then a more than additive increase in conductivity is observed relative to the conductivity's of the individual blend components.

because they are white in color, in comparison to the black color of conductive carbon modified polymers. The white color provides easy inspection of a shaped article for other contaminants such as dust and other particulates, which is especially desirable in clean room environments.

TABLE 10

| Ex # | Component A (wt % in blend) | ESI Component B (wt %) wt % (mol %) styrene (ESI #) | G # | wt % in blend | Component C (wt %) wt % (mol %) styrene (ESI #) | G # | wt % in blend | Conductivity* S/cm |
|---|---|---|---|---|---|---|---|---|
| 54 | FT-1000 (35) | 77.0 (47.4) (ESI #20) | 1.2 | 65 | — | — | — | <1E−8 |
| 55 | FT-1000 (35) | 80.0 (51.8) (ESI #17) | 10.0 | 65 | — | — | — | 3.7E−8 |
| 56 | FT-1000 (35) | 22.0 (7.06) (ESI #16) | 1.2 | 52 | 80.0 (51.8) (ESI #17) | 10.0 | 13 | 6.0E−8 |
| 57 | FT-1000 (35) | 22.0 (7.06) (ESI #16) | 1.2 | 13 | 80.0 (51.8) (ESI #17) | 10.0 | 52 | 1.5E−7 |
| 58 | FT-1000 (35) | 22.0 (7.06) (ESI #16) | 1.2 | 52 | 66 (34.3) | 11.2 | 13 | <1E−8 |
| 59 | FT-SN-100D (40) | 22.0 (7.06) (ESI #16) | 1.2 | 12 | 80.0 (51.8) (ESI #17) | 10.0 | 48 | 4.1E−6 |
| 60 | ET-300W (40) | 22.0 (7.06) (ESI #16) | 1.2 | 12 | 80.0 (51.8) (ESI #17) | 10.0 | 48 | <1E−8 |
| 61 | ET-500W (40) | 22.0 (7.06) (ESI #16) | 1.2 | 12 | 80.0 (51.8) (ESI #17) | 10.0 | 48 | <1E−8 |
| 62 | FT-3000 (40) | 22.0 (7.06) (ESI #16) | 1.2 | 12 | 80.0 (51.8) (ESI #17) | 10.0 | 48 | 9.0E−8 |
| 63 | SN-100P (40) | 22.0 (7.06) (ESI #16) | 1.2 | 12 | 80.0 (51.8) (ESI #17) | 10.0 | 48 | 8.6E−6 |
| 64 | FT-1000 (40) | 22.0 (7.06) (ESI #16) | 1.2 | 12 | 80.0 (51.8) (ESI #17) | 10.0 | 48 | 1.3E−6 |
| 65 | FT-1000 (40) | 22.0 (7.06) (ESI #16) | 1.2 | 48 | 80.0 (51.8) (ESI #17) | 10.0 | 12 | 1.7E−5 |

Examples 66

This Example shows that the use of two or more ethylene/styrene interpolymers is also advantageous in a rubber modified polypropylene ("TPO") since their addition results in enhancement of surface conductivity in comparison to the formulation having no Ethylene/styrene interpolymers.

TABLE 11

(all blends include Cabot XE-72 carbon black at 12 wt %)

| | Polypropylene (PP44) | | Polyethylene | | Rubber | | ESI #21 wt % (mol %) Styrene | G # | Wt. % | ESI #17 wt % (mol %) Styrene | G # | Wt. % | Conductivity (core) S/cm | Conductivity (surface) S/cm |
|---|---|---|---|---|---|---|---|---|---|---|---|---|---|---|
| Ex # | Wt. % | Name | Wt. % | Name | Wt. % | | | | | | | | | |
| Ex 66 | 52 | | 0 | EG 8200 | 26 | | 22 (7.1) | 8 | 5 | 80 (51.8) | 10 | 5 | 1.0E−6 | 2.6E−8 |
| Comp Ex 14 | 49 | IP-60 | 6 | EG 8200 | 33 | | | | | | | | 4.9E−6 | <1.0E−8 |

This data shows that when two ethylene/styrene interpolymer components are present in a blend with rubber-modified polypropylene conductivity can be observed at the surface of a injection molded sample as well as at the core. This allows for improved paint coating efficiency in automotive components such as bumpers, door panels, mirror housing and the like.

We claim:

1. A blend of polymeric materials comprising:
(A) from about 10 to about 94 weight percent based on the combined weights of Components A, B, and C of at least one substantially random interpolymer; and wherein said interpolymer;
   (1) contains from about 0.5 to about 65 mole percent of polymer units derived from at least one vinyl or vinylidene aromatic monomer;
   (2) contains from about 35 to about 99.5 mole percent of polymer units derived from ethylene;
   (3) has a molecular weight (Mn) greater than about 1,000;
   (4) has a melt index (I2) of from about 0.01 to about 1,000;
   (5) has a molecular weight distribution (Mw/Mn) of from about 1.5 to about 20; and
   (6) has a distribution of said polymer units which can be described by the Bernoulli statistical model or by a first or second order Markovian statistical model;
(B) from about 1 to about 25 weight percent (based on the combined weights of Components A, B, and C) of one or more conductive additives; and
(C) from about 5 to about 89 weight percent (based on the combined weights of Components A, B, and C) of one or more polymers selected from the group consisting of: polypropylene, homopolymers of ethylene, and copolymers of ethylene and at least one other comonomer selected from the group consisting of: propylene, 1-butene, 1-hexene, 4-methyl-1-pentene, and 1-octene; and wherein, for an injection or compression molded bar prepared from said blend and having a core, an upper and lower surface and a thickness of 3.175 mm, the conductivity at said upper or lower surface of said bar is greater than that at a surface of a bar also having a core, an upper and lower surface and a thickness of 3.175 mm but prepared only from a blend of Components B and C, and at the same concentration of Component B.

2. The blend of claim 1 wherein;
(i) Component A contains of from about 1 to about 55 mole percent of polymer units derived from;
   (a) at least one of said vinyl or vinylidene aromatic monomers, Component A(1)(a), represented by the following general formula:

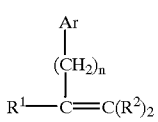

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4;

(ii) Component A has a molecular weight ($M_n$) of from about 5,000 to about 1,000,000;

(iii) Component A has a melt index ($I_2$) of from about 0.1 to about 100;

(iv) Component A has a molecular weight distribution ($M_w/M_n$) of from about 1.8 to about 10; and (v) Component B is selected from the group consisting of
 a) conducting carbon black, carbon fibers, graphite, or graphite fibers;
 b) metals and alloys selected from the group consisting of iron, nickel, steel, aluminum, zinc, lead, copper, bronze, brass, tin, zirconium, silver and gold;
 c) doped and undoped conjugated intrinsically electrically conductive polymers selected from the group consisting of substituted and unsubstituted polyanilines, polyacetylenes, polypyrroles, poly(phenylene sulfides), polyindoles, polythiophenes and poly(alkyl)thiophenes, polyphenylenes, polyvinylene/phenylenes, random or block copolymers of acetylenes and thiophenes, anilines and thiophenes, poly(N-methyl)pyrrole, poly(o-ethoxy)aniline, polyethylene dioxythiophene (PEDT), and poly (3-octyl)thiophene;
 d) semiconductors and conductors selected from the group consisting of doped and undoped metal oxides and nitrides selected from the group consisting of tantalum oxide, antimony doped tin oxide, titanium dioxide-coated with antimony doped tin oxide and aluminum nitride; and doped titanium dioxide; and
 e) high magnetic permeability additives selected from the group consisting of magnetite, ferric oxide ($Fe_3O_4$), MnZn ferrite, and silver-coated manganese-zinc ferrite particles.

3. A blend of claim 1 wherein
 i) said vinyl or vinylidene aromatic monomer, Component A1(a), is styrene; and
 ii) said conductive additive, Component B, is selected from the group consisting of conducting carbon black, carbon fibers, graphite, and graphite fibers.

4. The blend of claim 1 wherein;
 (i) Component B is a doped and/or undoped conjugated intrinsically electrically conductive polymers selected from the group consisting of substituted and unsubstituted polyanilines, polyacetylenes, polypyrroles, poly(phenylene sulfides), polyindoles, polythiophenes and poly(alkyl)thiophenes, polyphenylenes, polyvinylene/phenylenes, random or block copolymers of acetylenes and thiophenes, anilines and thiophenes, poly(N-methyl)pyrrole, poly(o-ethoxy)aniline, polyethylene dioxythiophene (PEDT), and poly (3-octyl)thiophene.

5. The blend of claim 1 wherein; Component B is a magnetic particle selected from the group consisting of magnetite, ferric oxide ($Fe_3O_4$), manganese-zinc ferrite, and silver-coated manganese-zinc ferrite particles.

6. The blend of claim 1 wherein;
 (i) Component C are homogeneous interpolymers having a narrow branching distribution and composition distribution prepared using a metallocene catalyst system.

7. The blend of claim 6 wherein;
 (i) Component C comprises a substantially linear interpolymers.

8. A blend of claim 1 wherein
 i) said vinyl or vinylidene aromatic monomer, Component A1(a), is styrene;
 ii) Component A2, is ethylene or a combination of ethylene with one or more C3–C8 α-olefins; and
 iii) said conductive additive, Component B, is polyaniline.

9. A blend of claim 1 wherein
 i) said vinyl or vinylidene aromatic monomer, Component A1(a), is styrene;
 ii) Component A2, is ethylene or a combination of ethylene with one or more C3–C8 α-olefins; and
 iii) said conductive additive, Component B, is an indium doped tin oxide, antimony doped tin oxide, or titanium dioxide-coated with antimony doped tin oxide.

10. A blend of claim 1 further comprising;
 (D) an additive selected from the group consisting of talc, calcium carbonate, alumina trihydrate, glass fibers, marble dust, cement dust, clay, feldspar, silica or glass, fumed silica, alumina, magnesium oxide, magnesium hydroxide, indium doped tin oxide, antimony oxide, zinc oxide, barium sulfate, aluminum silicate, calcium silicate, titanium dioxide, titanates, glass microspheres, chalk and any combination thereof.

11. A blend of claim 1 wherein Component A is a crosslinked interpolymer.

12. A blend of claim 3 wherein Component A is a crosslinked interpolymer.

13. A blend of claim 4 wherein Component A is a crosslinked interpolymer.

14. A blend of claim 5 wherein Component A is a crosslinked interpolymer.

15. A blend of claim 7 wherein Component A is a crosslinked interpolymer.

16. A blend of claim 8 wherein Component A is a crosslinked interpolymer.

17. A blend of claim 9 wherein Component A is a crosslinked interpolymer.

18. A blend of claim 1 wherein in Component B has a magnetic permeability 20 times greater than that of copper.

19. A blend of claim 18 wherein in Component B has a magnetic permeability 100 times greater than that of copper.

20. An article resulting from injection, compression, extrusion, coextrusion, or blow molding, solution casting, thermoforming, or rotomolding the blend of claim 1.

21. An article resulting from coating a substrate with the blend of claim 1.

22. A sheet, film, multilayered structure, prepared from the blend of claim 1.

23. A wire or cable assembly prepared from the blend of claim 1.

24. A tire prepared from the blend of claim 1.

25. A flooring system, bench top or counter top prepared from the blend of claim 1.

26. A conductive foam or fiber prepared from the blend of claim 1.

27. A conductive foam comprising a blend of polymeric materials comprising:
 (A) from about 10 to about 94 weight percent based on the combined weights of Components A, B, and C of at least one substantially random interpolymer; and wherein said interpolymer;
  (1) contains from about 0.5 to about 65 mole percent of polymer units derived from at least one vinyl or vinylidene aromatic monomer;
  (2) contains from about 35 to about 99.5 mole percent of polymer units derived from ethylene;

(3) has a molecular weight (Mn) greater than about 1,000;
(4) has a melt index ($I_2$) of from about 0.01 to about 1,000;
(5) has a molecular weight distribution (Mw/Mn) of from about 1.5 to about 20; and
(6) has a distribution of said polymer units which can be described by the Bernoulli statistical model or by a first or second order Markovian statistical model;

(B) from about 1 to about 25 weight percent (based on the combined weights of Components A, B, and C) of one or more conductive additives; and (C) from about 5 to about 89 weight percent (based on the combined weights of Components A, B, and C) of one or more polymers selected from the group consisting of: polypropylene, homopolymers of ethylene, and copolymers of ethylene and at least one other comonomer selected from the group consisting of: propylene, 1-butene, 1-hexene, 4-methyl-1-pentene, and 1-octene;

and wherein, for an injection or compression molded bar prepared from said blend and having a core, an upper and lower surface and a thickness of 3.175 mm, the conductivity at said upper or lower surface of said bar is greater than that at a surface of a bar also having a core, an upper and lower surface and a thickness of 3.175 mm but prepared only from a blend of Components B and C, and at the same concentration of Component B.

28. The foam of claim 27 wherein Component B is selected from the group consisting of carbon black, alkyl amines; quaternary ammonium compounds, $LiPF_6$, $KPF_6$, lauryl pyridinium chloride, sodium cetyl sulphate, glycerol esters, sorbitan esters, and ethoxylated amines.

29. A latex comprising the blend of claim 1.

* * * * *